US012753860B2

(12) United States Patent
Rand et al.

(10) Patent No.: US 12,753,860 B2
(45) Date of Patent: Oct. 6, 2026

(54) WIRE POSITIONING DEVICE

(71) Applicant: Affordable Wire Management, LLC, Bedminster, NJ (US)

(72) Inventors: Scott Robert Rand, Bedminster, NJ (US); Daniel Robert Smith, Bedminster, NJ (US)

(73) Assignee: Affordable Wire Management, LLC, Bedminster, NJ (US)

( * ) Notice: Subject to any disclaimer, the term of this patent is extended or adjusted under 35 U.S.C. 154(b) by 6 days.

(21) Appl. No.: 18/812,622

(22) Filed: Aug. 22, 2024

(65) Prior Publication Data

US 2025/0060051 A1 Feb. 20, 2025

Related U.S. Application Data

(63) Continuation of application No. 18/150,586, filed on Jan. 5, 2023, now Pat. No. 12,110,996, which is a
(Continued)

(51) Int. Cl.
*F16L 3/12* (2006.01)
*F16L 3/133* (2006.01)
*H02G 3/30* (2006.01)

(52) U.S. Cl.
CPC ............ *F16L 3/1218* (2013.01); *F16L 3/133* (2013.01); *H02G 3/30* (2013.01)

(58) Field of Classification Search
CPC ........... F16L 3/1218; F16L 3/133; H02G 3/30
See application file for complete search history.

(56) References Cited

U.S. PATENT DOCUMENTS 303,297 A 8/1884 Langford
507,394 A * 10/1893 Trewhella ............ F16B 45/012 248/339
(Continued)

FOREIGN PATENT DOCUMENTS

DE 10004126 A1 * 8/2001 ............ F16B 45/015
DE 202018004406 U1 * 10/2018 ............ A47G 29/08
(Continued)

OTHER PUBLICATIONS

International Search Report and Written Opinion for PCT Application No. PCT/US2022/019968, mailed on Aug. 10, 2022, 7 pages.
(Continued)

*Primary Examiner* — Eret C Mcnichols
(74) *Attorney, Agent, or Firm* — Mintz Levin Cohn Ferris Glovsky and Popeo PC

(57) ABSTRACT

An aluminum wire positioning device system for solar panel cabling and harness string cabling is provided that includes a support structure, a cable, and a wire positioning device. The wire positioning device includes a center leg, an attachment support leg, an attachment member configured to couple the wire positioning device to the solar panel frame or solar panel support structure at an attachment point, a saddle support leg, and a cable support saddle configured to support the at least one cable. The attachment member is arranged at an angle relative to the cable support saddle about the center leg, and a center-of-gravity of the wire positioning device is aligned with the attachment point, the center leg, and the saddle support leg.

18 Claims, 46 Drawing Sheets

Related U.S. Application Data continuation of application No. 18/013,088, filed as application No. PCT/US2022/019968 on Mar. 11, 2022, now Pat. No. 11,953,129.

(60) Provisional application No. 63/159,674, filed on Mar. 11, 2021.

(56) References Cited

U.S. PATENT DOCUMENTS

| | | | | |
|---|---|---|---|---|
| D35,527 | S | 12/1901 | Hough | |
| 757,944 | A | 4/1904 | Meyercord | |
| 815,060 | A | 3/1906 | Beebe | |
| 1,667,541 | A | 4/1928 | Edeburn | |
| 3,219,302 | A | 11/1965 | Smith | |
| 3,240,463 | A * | 3/1966 | Cook | A47G 29/083 248/303 |
| D211,199 | S | 5/1968 | Serle | |
| 4,117,256 | A | 9/1978 | Williams | |
| 4,131,259 | A | 12/1978 | Franks | |
| 4,232,847 | A | 11/1980 | Cooper | |
| D260,144 | S | 8/1981 | Miyamoto | |
| 4,714,221 | A | 12/1987 | Cawrey | |
| D300,302 | S | 3/1989 | Possemato | |
| 4,957,259 | A | 9/1990 | Wolf, Jr. | |
| 5,054,728 | A | 10/1991 | Nigro, Jr. | |
| 5,232,189 | A | 8/1993 | Koch | |
| D360,572 | S | 7/1995 | Adams | |
| 5,476,240 | A * | 12/1995 | McDonough | B44D 3/123 248/303 |
| 5,490,650 | A | 2/1996 | Pendergrass | |
| D373,072 | S | 8/1996 | Durante | |
| 5,577,699 | A | 11/1996 | Gardner et al. | |
| D404,127 | S | 1/1999 | Lammers | |
| D422,888 | S | 4/2000 | Outten | |
| 6,364,266 | B1 | 4/2002 | Garvin | |
| D458,116 | S | 6/2002 | Roethler | |
| 6,659,414 | B1 | 12/2003 | Guilmette | |
| D489,963 | S | 5/2004 | Mazooji et al. | |
| D504,934 | S | 5/2005 | Amburgey | |
| D532,074 | S | 11/2006 | Travis, Sr. | |
| 7,137,607 | B2 | 11/2006 | Hibbs et al. | |
| D554,980 | S | 11/2007 | Mihelis | |
| D582,451 | S | 12/2008 | Davies et al. | |
| D582,453 | S | 12/2008 | Davies | |
| D582,454 | S | 12/2008 | Davies et al. | |
| D582,455 | S | 12/2008 | Davies et al. | |
| D585,265 | S | 1/2009 | Meyers | |
| D600,102 | S | 9/2009 | Larkin | |
| D612,710 | S | 3/2010 | Kelleghan | |
| 7,726,619 | B2 | 6/2010 | Lien | |
| 7,823,852 | B1 | 11/2010 | Reno | |
| 8,286,928 | B2 | 10/2012 | Lien | |
| D679,095 | S | 4/2013 | Williams et al. | |
| D680,966 | S | 4/2013 | Gross | |
| D680,967 | S | 4/2013 | Gross | |
| D680,969 | S | 4/2013 | Gross | |
| 8,479,931 | B1 | 7/2013 | Richards et al. | |
| D687,291 | S | 8/2013 | Hendricks | |
| D699,556 | S | 2/2014 | Hendricks | |
| D703,815 | S | 4/2014 | Bolia | |
| 8,783,628 | B2 * | 7/2014 | Jette | F16L 3/221 248/68.1 |
| 9,166,385 | B2 | 10/2015 | Newman | |
| D777,679 | S | 1/2017 | Chia | |
| 9,722,405 | B2 * | 8/2017 | Smith | H02G 3/30 |
| D796,944 | S | 9/2017 | Davis et al. | |
| 9,797,550 | B1 | 10/2017 | Grant et al. | |
| 9,800,028 | B1 * | 10/2017 | Smith | H02G 3/0443 |
| D806,409 | S | 1/2018 | Schapiro | |
| D822,614 | S | 7/2018 | Baldwin | |
| 10,226,570 | B2 | 3/2019 | La Berge | |
| 10,247,329 | B2 | 4/2019 | Wolff | |
| D848,378 | S | 5/2019 | Gross | |
| D865,497 | S | 11/2019 | Williamson | |
| D874,906 | S | 2/2020 | Ruddick et al. | |
| D878,192 | S | 3/2020 | Markusic et al. | |
| 10,670,170 | B2 | 6/2020 | Shea et al. | |
| D899,906 | S | 10/2020 | Neusch | |
| D907,471 | S | 1/2021 | Clark | |
| D919,417 | S | 5/2021 | Wedding et al. | |
| D922,182 | S | 6/2021 | Wedding et al. | |
| D988,846 | S | 6/2023 | Veldkamp et al. | |
| D1,009,609 | S | 1/2024 | Rand et al. | |
| D1,009,799 | S | 1/2024 | Rand et al. | |
| D1,009,800 | S | 1/2024 | Rand et al. | |
| 11,953,129 | B2 | 4/2024 | Rand et al. | |
| 12,027,838 | B2 * | 7/2024 | Thompson | F16L 3/06 |
| 12,110,996 | B2 | 10/2024 | Rand et al. | |
| 12,249,822 | B2 * | 3/2025 | Martin | H02G 3/263 |
| 2004/0159751 | A1 | 8/2004 | Boon et al. | |
| 2005/0000068 | A1 | 1/2005 | Waszak et al. | |
| 2007/0114350 | A1 | 5/2007 | Sorci | |
| 2013/0014352 | A1 * | 1/2013 | Wells | F16B 45/012 24/265 H |
| 2014/0027582 | A1 | 1/2014 | Newman | |
| 2015/0276093 | A1 * | 10/2015 | Aotani | H02G 3/32 248/72 |
| 2016/0258554 | A1 | 9/2016 | Ripoll Agullo et al. | |
| 2017/0245487 | A1 * | 8/2017 | Petersen | A01M 1/20 |
| 2018/0317336 | A1 * | 11/2018 | Jette | H02G 3/263 |
| 2019/0211867 | A1 | 7/2019 | Hohn | |
| 2020/0011453 | A1 | 1/2020 | Allender-Zivic | |
| 2021/0032460 | A1 | 2/2021 | Westerbeek VVan Eerten et al. | |
| 2022/0038046 | A1 | 2/2022 | Wedding et al. | |
| 2022/0074522 | A1 | 3/2022 | Stubben et al. | |
| 2022/0255300 | A1 | 8/2022 | Rand et al. | |
| 2023/0141833 | A1 | 5/2023 | Rand et al. | |
| 2023/0147676 | A1 * | 5/2023 | Rand | F16L 3/1218 248/303 |

FOREIGN PATENT DOCUMENTS

| | | | | |
|---|---|---|---|---|
| GB | 2546472 | A * | 7/2017 | E04H 12/2253 |
| WO | 2022192680 | A1 | 9/2022 | |

OTHER PUBLICATIONS

Invitation to Pay Additional Fees for PCT/US2022/019968, mailed on Jun. 2, 2022, 2 pages.

* cited by examiner

WIRE DIAMETER = 3mm [0.118in]

WIRE DIAMETER = 4mm [0.1575in]

WIRE DIAMETER = 3mm

| PART NO. TABLE | |
|---|---|
| | LEG LENGTH "L1" |
| | 0.31 |
| | 0.34 |
| | 0.40 |
| | 0.50 |

WIRE DIAMETER = 0.118in

| PART NO. TABLE | | |
|---|---|---|
| "X" DIM (WIRE DIAMETER) | "Y" DIM (LEG LENGTH) | "Z" DIM (LEG ANGLE) |
| Ø0.157in | 4.5in | 146° |
| Ø0.157in | 4.6in | 136° |
| Ø0.157in | 4.7in | 126° |
| Ø0.118in | 4.5in | 175° |
| Ø0.118in | 4.6in | 136° |
| Ø0.118in | 5.5in | 112° |
| Ø0.079in | 4.5in | 146° |
| Ø0.079in | 4.6in | 136° |
| Ø0.079in | 4.7in | 126° |

WIRE POSITIONING DEVICE

CROSS-REFERENCE TO RELATED APPLICATIONS

The present application is a Continuation of U.S. application Ser. No. 18/150,586, filed Jan. 5, 2023 and entitled "WIRE POSITIONING DEVICE," which is a Continuation of U.S. application Ser. No. 18/013,088, filed on Dec. 27, 2022 and entitled "WIRE POSITIONING DEVICE," which claims priority under 35 U.S.C. 371 to PCT Application No. PCT/US22/19968, filed on Mar. 11, 2022 and entitled "WIRE POSITIONING DEVICE," which claims priority under 35 U.S.C. § 119(e) to U.S. Provisional Patent Application No. 63/159,674, filed on Mar. 11, 2021 and entitled "WIRE POSITIONING DEVICE," the entire contents of which are hereby expressly incorporated by reference herein in their entirety.

FIELD

The present application generally relates to wire positioning devices for cables, and more specifically, to aluminum wire positioning device for solar panel cables and harness string cables found on Utility-scale solar generation plant.

BACKGROUND

Energy production and transmission infrastructures, such as Photovoltaic (PV) Solar energy production, utilize a number of cable types to convey electrical current, and/or signal data from source facilities to consumer locations. In large-scale solar power plants, cables can convey electrical current and signal data from solar panels to other production and/or transmission equipment within the plant.

The solar panel lead wires and the string harness cables that connect the solar panels together are typically supported and arranged above-ground, either directly supported on the solar panel framing or the steel structure in which the solar panel is secured to. The cables are supported in the air and must be supported in a safe manner, which is capable of withstanding harsh environmental conditions.

In some instances, the solar panels are attached to a single-axis solar tracker, which rotates the solar panel from east to west throughout the day, such that the solar panels follow the sun, maximizing their energy output. These solar trackers have both moving and rotating components, potentially creating pinch and abrasion situations with the cables if the cabling is secured on or near these components, which can lead to electrical shock hazards.

SUMMARY

Wire positioning devices for cables are provided.

In one embodiment, a wire positioning device is provided having a support structure, at least one cable, and a wire positioning device. The wire positioning device includes a center leg having a distal end and a proximal end, an attachment support leg arranged on the proximal end of the center leg, an attachment member arranged on the attachment support leg opposite the center leg and configured to couple the wire positioning device to the support structure at an attachment point, a saddle support leg arranged on the distal end of the center leg, and a cable support saddle coupled to the saddle support leg opposite the center leg and configured to support the at least one cable. The attachment member is arranged at an angle relative to the cable support saddle about the center leg, and a center-of-gravity of the wire positioning device is aligned with the attachment point, a portion of the center leg, and the saddle support leg.

The attachment member can have a variety of configurations for coupling the wire positioning device to the support structure. For example, in some embodiments, the attachment member can be a hook including a bent portion and a straight portion arranged parallel to the attachment support leg. In other embodiments, the attachment member can be arranged perpendicular to the cable support saddle about the center leg. In certain embodiments, the attachment member can be configured to be arranged within a through-bore within the support structure. In some embodiments, the attachment member can be configured to partially enclose a portion of the support structure.

In some embodiments, the support structure can be configured to rotate relative to a support surface. In other embodiments, the center-of-gravity of wire positioning device can be configured to remain aligned with the attachment point, the center leg, and the saddle support leg as the support structure rotates relative to a support surface.

In some embodiments, the center leg can include an offset to arrange the attachment support leg and the saddle support leg parallel to one another.

In some embodiments, a plurality of cables can be configured to be arranged within the cable support saddle.

The cable support saddle can have a variety of configurations for inserting and retaining cables therein. For example, in some embodiments, the cable support saddle can include a retention leg arranged parallel to the saddle support leg. In other embodiments, the retention leg can be coupled to the cable support saddle at an acute angle. In certain embodiments, a gap can be arranged between the retention leg and the saddle support leg, where the at least one cable can be configured to move through to gap to be supported by the cable support saddle. In some embodiments, the retention leg can include a bent end section arranged on an end opposite the cable support saddle. In other embodiments, a portion of the bent end section can extend past the attachment member. In certain embodiments, the bent end section can extend outward at an angle away from the center leg. In certain embodiments, the bent end section can extend inward at an angle towards the center leg.

In other embodiments, the attachment member can be coupled to the support structure and the at least one cable can be positioned within the cable support saddle. In other embodiments, the attachment member can be arranged within a through-bore of the support structure to couple the wire positioning device to the support structure, and the at least one cable can be positioned within the cable support saddle and abutting the cable support saddle.

In some embodiments, the wire positioning device is formed or aluminum.

In another embodiment, a wire positioning device system is provided that includes a first support structure, a second support structure arranged offset from the first support structure such that a gap is arranged therebetween, at least one cable arranged within the gap, and a wire positioning device. The wire positioning device includes a first attachment support leg having a proximal end and a distal end, a first attachment member arranged on the distal end of the first attachment support leg and configured to couple the wire positioning device to the first support structure, a second attachment support leg having a proximal end and a distal end, and a second attachment member arranged on the distal end of the second attachment support leg and configured to couple the wire positioning device to the second support structure. The first attachment support leg is coupled to the second attachment support leg at each distal end, the first attachment support leg coupled to the second attachment support leg form a cable support saddle configured to support the at least one cable. Additionally, the cable support saddle extends across the gap from the first support structure to the second support structure.

The attachment members can have a variety of configurations for supporting the cable between the first and second support structures. For example, in some embodiments, the first attachment member and the second attachment member can be substantially identical. In other embodiments, the first attachment member can be a first hook arranged to pass through a first though-bore arranged within the first support structure, and the second attachment member can be a second hook arranged to pass through a second though-bore arranged within the second support structure.

In some embodiments, the first attachment support leg can be coupled to the second attachment support leg at an acute angle.

In some embodiments, the wire positioning device is formed or aluminum.

In another embodiment, a wire positioning device system includes a solar panel frame and/or solar panel support structure, at least one solar panel cable and/or harness string cable, and an aluminum wire positioning device. The aluminum wire positioning device includes a first center leg, a first attachment support leg, a first attachment member, a first saddle support leg, a cable support saddle, a second center leg, a second attachment support leg, a second attachment member, and a second saddle support leg.

In some embodiments, the cable support saddle can be configured to be a stopper against the wire positioning device to prevent the at least one solar panel cable and/or harness string cable from sliding in the wire positioning device, and for allowing the slack of the at least one solar panel cable and/or harness string cable to be adjusted on either side of the wire positioning device.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Solar panel cabling and harness string cabling, such as those used in utility scale solar power generation and transmission systems, can be deployed and managed using a wire positioning device. Typically, these cables are not buried underground as the solar panels are installed at least three feet above the ground, so to route the cabling from the solar panel to an underground trench is costly and time consuming for the installer. In addition, the wires typically have to be larger diameter when installed below ground. The wire positioning device can support the cables, such as harness cables, in an organized and serviceable manner. When these cables are secured with zip ties or cables ties, the cables are not secured in an organized and serviceable manner.

Figure 6:
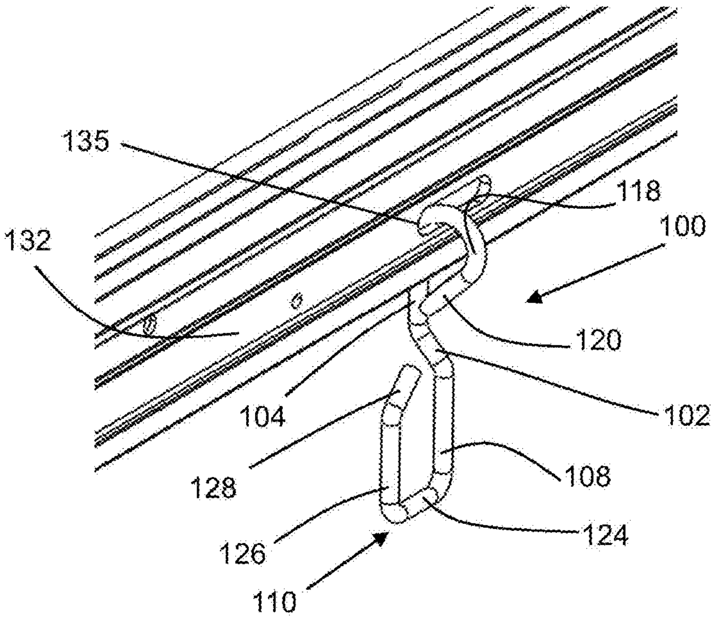
FIG. 6 is a perspective view illustrating the wire positioning device of FIG. 1 crimped to a support structure.
Figure 7:
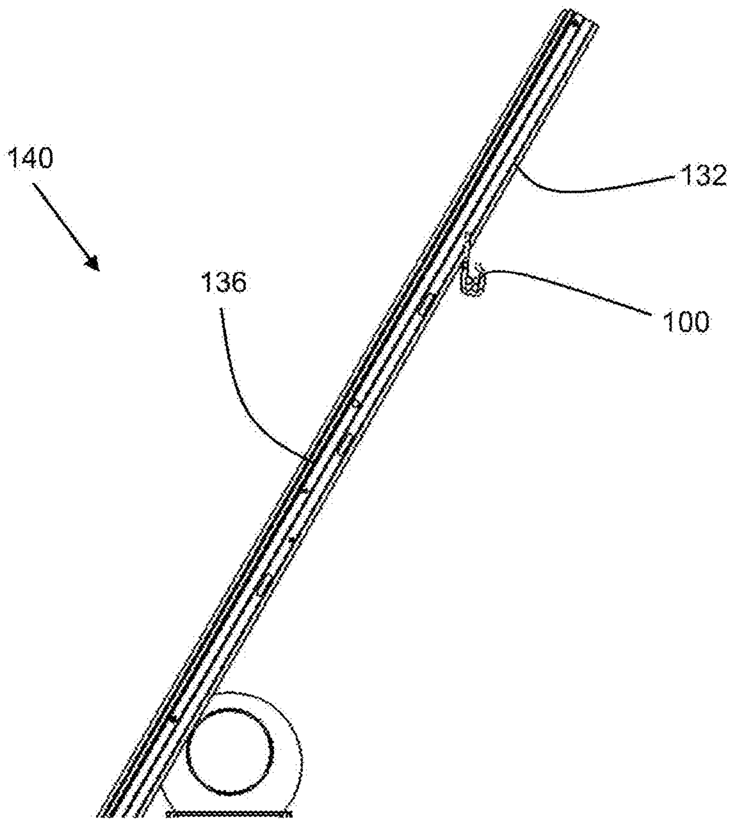
FIG. 7 is a side view illustrating an assembly of a solar tracker, a solar panel, the wire positioning device of FIG. 1, and cables, where the solar tracker is at a maximum tilt angle.

A wire positioning device can couple to a structure or to a frame. When these cables are secured to the structure, there is risk that the cables chafe, abrade, and pinch on the moving and rotating components of the structure, the primary component that could pinch the cabling would be the Solar Tracker Bearing and Torque Tube (a single-axis Tracker has a component call the Torque Tube in which the Solar Panels attach to, this Torque Tube rests on top of bearings which can rotate, if cabling is secured close to the Torque Tube and near the bearing, cabling can get caught between these components as the Torque Tube rotates). In addition, other components such as Actuators and Dampers can also be potential pinch points for cabling. There are numerous Thin Sheet Steel components in which the cable could abrade on such as: Pile, Bearing Housing, Solar Panel Mounting Rail, Actuator Mounting Brackets, Slew Drive Motor Mounting Brackets, Damper Mounting Brackets, Controller Mounting Brackets. As described above, panels can rotate, creating a potential electrical shock safety hazard and can also lead to energy production issues. As shown in FIG. 6, when the wire position device is coupled to the Frame, the cable is supported at a safe distance away from the moving and rotating components of a structure.

Over the life of utility-scale solar power plants, solar panels, trackers, and cabling occasionally need servicing and may be temporary un-installed or removed. With wire positioning devices that lock close, such as zip ties and cables ties, the wire positioning device must be cut down and destroyed before the cabling can be removed from the device. The open-saddle of the wire-position device allows for maintenance and removal of the cable without the need to cut-down or destroy the wire position device. Furthermore, due to the open latching hook of the device, the device can be removed from the solar panel without the need to cut down or destroy the wire positioning device.

Utility-scale solar power plants are typically located in environmental conditions of extreme heat or extreme cold. Some wire positioning devices, such as plastic zip ties or cables ties, or vinyl-coated products, will degrade in a UV environment, and will become brittle in extreme cold environments. Some implementations of the wire positioning device described herein be made from ultraviolet (UV) and cold-environment resistance material, such as aluminum, galvanized steel, stainless steel, and copper. The device can also be made from UV-resistance and brittle-resistance thermoplastic materials.

For wire positioning devices such as zip ties or cables ties, these devices cannot support cables until the device is locked into position. In other words, the cabling and the device must be installed at the same time, and thus require at least two hands to install the cable tie and cable. Specifically, the installer has to hold the cable tie in position, such that it does not slip out of the solar panel frame, then must lift the cable up and secure the zip tie around the cable, then lock the zip tie in place. Some implementations of the wire positioning device described herein can be configured such that the open access wire position device can first be latched onto the solar panel with a single hand, then cables can be lifted and placed into the cable saddle with a single hand, allowing for a seamless, single-hand installation operation.

For locking positioning devices, such as zip ties or cables ties, all the cables must be installed at a single time and cables cannot be added or removed from the locking wire-position device without cutting down and destroying the wire positioning device, and then installing a new device. Some implementations of the wire positioning device described herein can be configured such that the open-access wire-position device allows for cables to installed and removed at varying times without the need of removing or destroying the wire-positioning device.

Some implementations of the wire positioning devices described herein includes an open-access design for large scale deployment in energy generation and transmission infrastructures, such as solar panel and solar energy generation infrastructures, which are advantageous to the existing wire positioning devices. "Open-Access" can be defined herein as a device that has an open hook and an open saddle and does not lock closed. In other words, open-access devices can allow for maintaining and accessing the solar panel cabling and harness string cabling without modifying the wire position devices. Furthermore open-access devices can allow maintaining and removing the wire positioning device from the solar panel frame or support structure without modifying it.

Some implementations of wire positioning devices described herein can include features to maintain the structural integrity of the cable material when exposed to high UV light or extreme cold environmental conditions. The wire positioning device can support the cables in an organized and serviceable manner that allows for easy arrangement of the cables. Two positive solar harness conductors can be arranged on the left most portion of the cable saddle and two negative solar harness conductors can be arranged on the right most portion of the cable saddle. In some implementations, the cabling is pulled tight, along with the wire positioning device, causing tensile/axial stress to be applied to the device at the location where it attaches to the solar panel frame. When the device is made from low tensile-strength materials, such as thin steel wire, or the thermoplastic materials that zip ties are made from, the device can deform or fracture and break, potentially causing cables to fall and become damaged or create an unsafe environment. Some implementations of the wire positioning device disclosed herein has suitable tensile strength to withstand even the worst-case axial stress conditions.

In addition, thermoplastic materials are much softer than the aluminum material of the solar panel frame, so as the zip tie rotates back and forth in the solar panel frame hole, (rotation occurs due to the solar panel rotating on the single-axis tracker, or dynamic events, such as wind or seismic, can cause the zip tie to rotate back and forth in the hole) the thermoplastic material can abrade and rub away over time. Over the life of the solar power plant, the zip tie can be completely cut in half from this rubbing action and fail. In addition, some wire position devices can be made of steel, whereas the solar panel frame can be made of aluminum, where this interaction between the two dissimilar metals can cause galvanic corrosion over the life the power plant, potentially causing both the wire position device and the solar panel frame to fail. In addition, the steel material has a higher hardness than the solar panel frame material, which is aluminum. Therefore, over time the steel material can rub away the solar panel frame material, potentially weakening the strength of the solar panel frame. In exemplary embodiments, the wire positioning device can be made from the same material as the solar panel frame, such as aluminum, so there is no potential of risk of galvanic corrosion over the life of the power plant. The aluminum material is more resistant to atmospheric corrosion than steel, zinc coatings, or copper, so the aluminum solar wire positioning device will corrode less than wire positioning devices made from other materials, which is advantageous to solar power generation plant owners and operators since the aluminum solar wire positioning device will last longer than other materials.

Some exemplary implementations of the wire positioning devices described herein can be installed directly onto a bundle of cabling. When the wire positioning device is coupled with the solar cabling and installed close to another wire positioning device, the wire positioning device is configured to act as a "stopper," preventing the solar cables from sliding or moving in the other wire positioning device. This also allows for the adjustment of a solar cable's tension and sag on either side of the cable hanger, which is advantageous for some installation methodologies to prevent excessive cable slack from sliding in the wire positioning device.

Accordingly, some implementations of the current subject matter include an approach to positioning solar panel cables and solar harness cables within an aluminum wire positioning device which supports and organizes the cables in a serviceable manner. By using an attachment member with an open hook design and an open cable support saddle design, some implementations of wire positioning devices described herein can allow for maintaining and accessing the cables arranged therein, while also allowing for easy installation of the wire positioning devices on a solar panel support structure or solar panel frame, which is advantageous to the installer since it will increase installation speed over traditional cable support methods. This is also advantageous to the operator and maintainer of the solar power generation plant as the cables and solar panels can be serviced faster over traditional cable support methods.

FIGS. 1-4 illustrate one example embodiment of a wire positioning device 100 configured to organize and support various cables or wires. As shown, the wire positioning device 100 generally includes a center leg 102, an attachment support leg 104, an attachment member 106, a saddle support leg 108, and a cable support saddle 110. Between each of the members and legs that form the wire positioning device 100, there can be a transitional piece that includes a radius such that there are no sharp edges on the wire positioning device 100.

The center leg 102 includes a proximal end 102*a* and a distal end 102*b*. The center leg 102 is arranged substantially at the center-of-gravity of the wire positioning device 100. The center leg 102 includes an offset between the attachment support leg 104 and the saddle support leg 108. That is, the center leg 102 is bent such that the center leg 102 can arrange the attachment support leg 104 and the saddle support leg 108 parallel to one another, but not aligned along the same axis. This offset design of the center leg 102 allows for a center-of-gravity 112 of the wire positioning device 100 to be aligned with an attachment point 114, a portion of the center leg 102, and the saddle support leg 108 of the wire positioning device 100 along an alignment plane 116. This positioning along alignment plane 116 prevents the wire positioning device 100 from rotating once installed onto a solar panel frame or support structure. The primary concern with the wire positioning device 100 rotating is that cables could potential dislodge and fall out of the wire positioning device 100 if the rotation is extreme enough. This also allows for the wire positioning device 100 and cables to stay normal with a support surface of a ground surface as a solar tracker frame or support structure rotates throughout the day.

The attachment support leg 104 is arranged on the proximal end 102*a* of the center leg 102. The attachment member 106 is arranged on the attachment support leg 104 on an opposite side of the attachment support leg 104 than the center leg 102. The attachment member 106 is configured to couple the wire positioning device 100 to a solar panel support structure or solar panel frame (shown in FIGS. 5-12) at an attachment point 114. In some embodiments, the attachment member 106 can be a hook including a bent portion 118 and a straight portion 120. The straight portion 120 can be arranged parallel to the attachment support leg 104.

Figure 1:
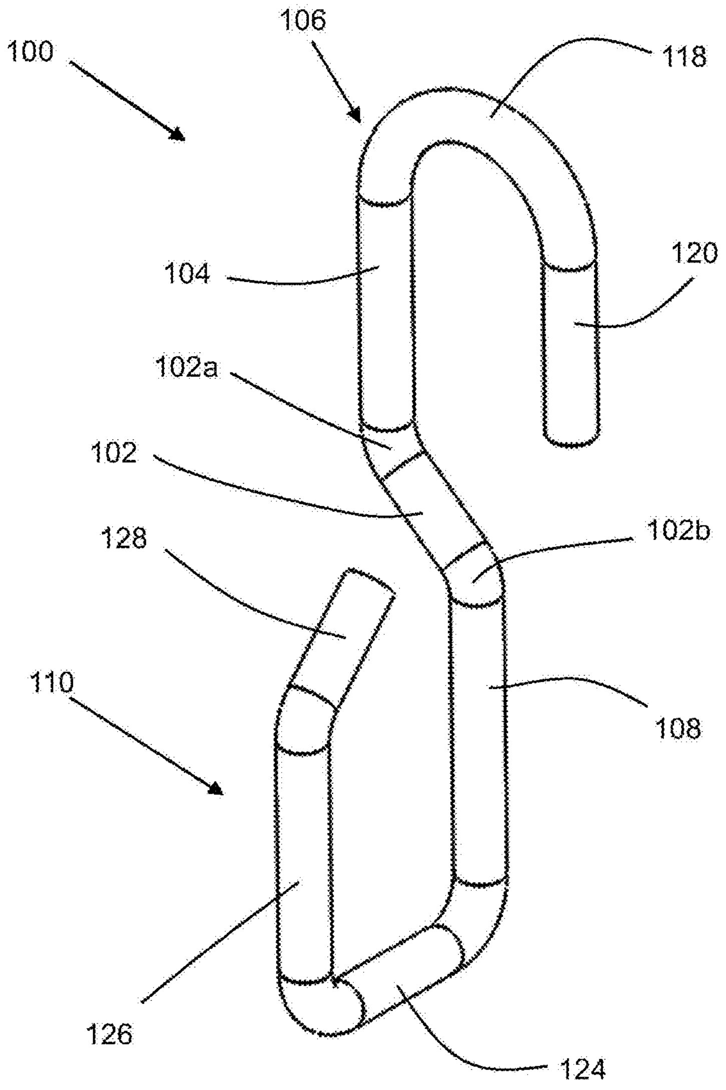
FIG. 1 is a top perspective view of one embodiment of a wire positioning device.
Figure 2:
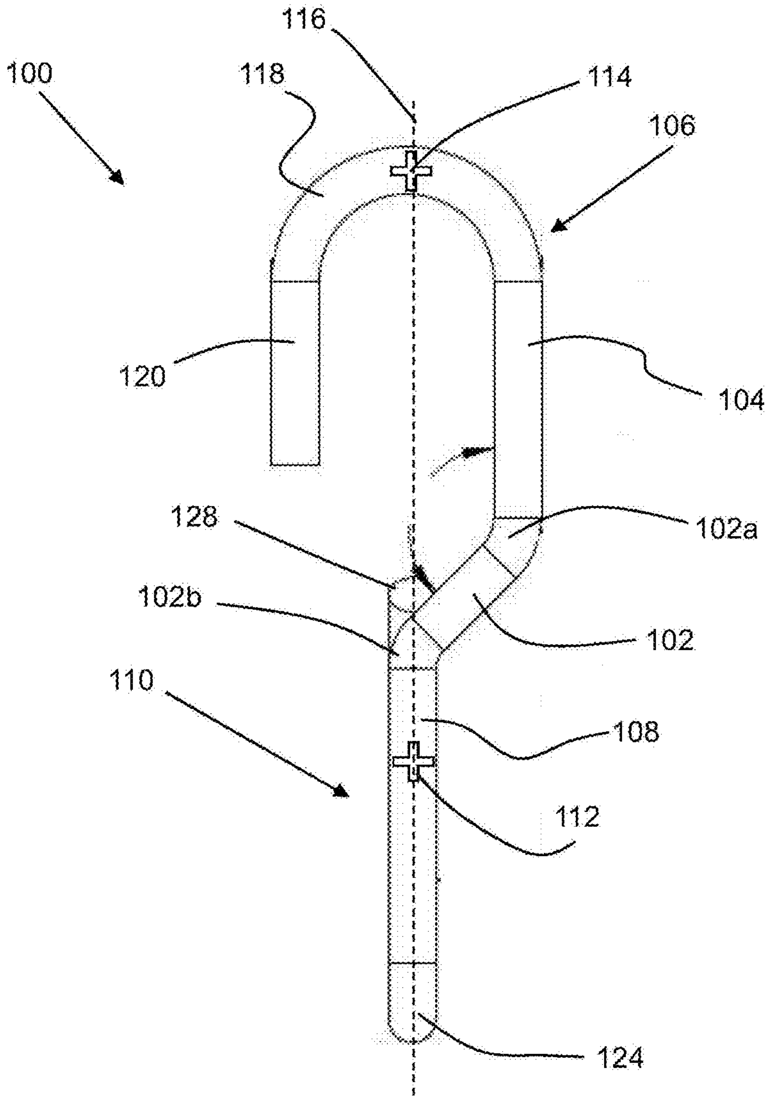
FIG. 2 is a left side view of the wire positioning device of FIG. 1.
Figure 3:
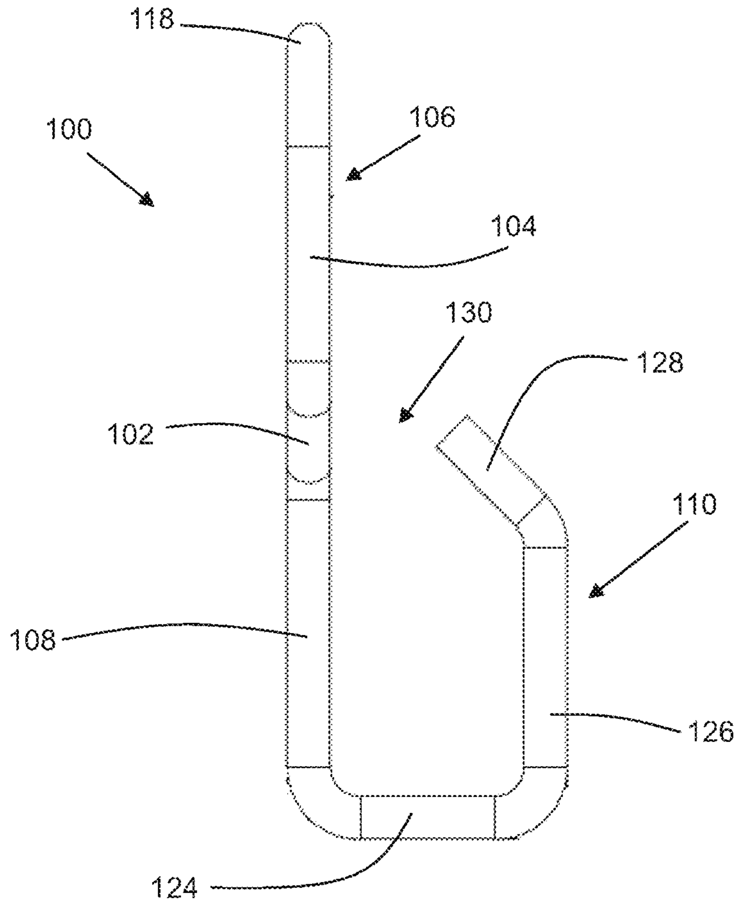
FIG. 3 is a right side view of the wire positioning device of FIG. 1.
Figure 4:
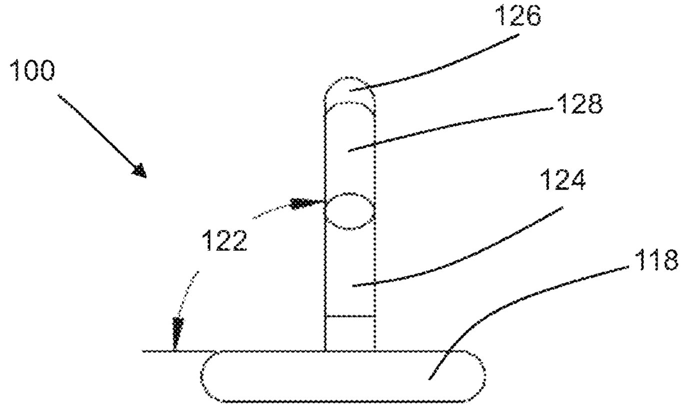
FIG. 4 is a top view of the wire positioning device of FIG. 1.
Figure 5:
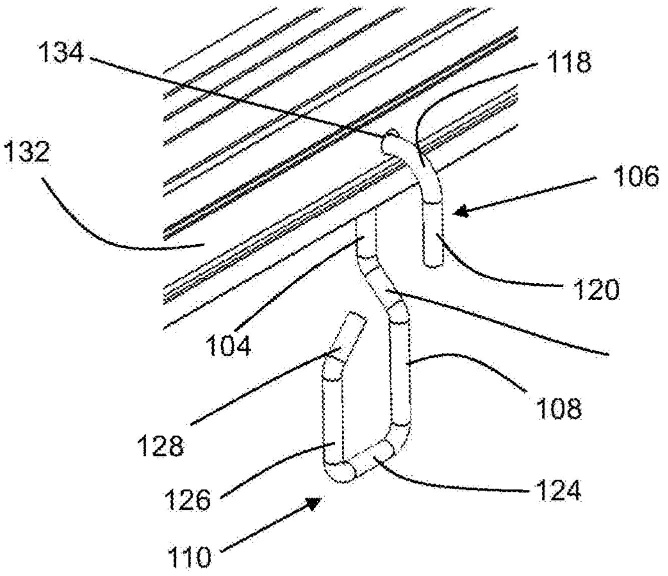
FIG. 5 is a perspective view illustrating the wire positioning device of FIG. 1 coupled to a support structure.

In an exemplary embodiment, as depicted in FIG. 4, the attachment member 106 can be arranged at an angle 122 relative to the cable support saddle 110 about the center leg 102. In certain embodiments, the angle 122 is within a range 1-180 degrees, or within the range of 45-135 degrees, or within the range of 80-100 degrees. In some implementations, the angle 122 is 90 degrees, and/or within a range of 89-91 degrees. By rotating the attachment member 106 perpendicular to the support saddle 110, the center-of-gravity 112 of the wire positioning device 100 can be positioned along the alignment plane 116. As described below, the attachment member 106, and specifically the bent portion 118, can be configured to be arranged within a through-bore within a support structure. Additionally, the attachment member 106 can be configured to partially enclose a portion of a support structure.

The saddle support leg 108 is arranged on the distal end 102*b* of the center leg 102, opposite the attachment support leg 104. The cable support saddle 110 is coupled to the saddle support leg 108 opposite the center leg 102, and is configured to support at least one cable. The cable support saddle 110 includes a bottom leg 124 and a retention leg 126. In some embodiments, the bottom leg 124 is integral with the saddle support leg 108 and is positioned at a 90-degree angle relative to the saddle support leg 108. In some embodiments, the retention leg 126 can be arranged parallel to the saddle support leg 108. Additionally, the retention leg 126 is coupled to the bottom leg 124 at an acute angle.

In an exemplary embodiment, the retention leg 126 includes a bent end section 128 arranged on an end opposite the bottom leg 124. The bent end section 128 extends inward at an angle towards the center leg 102 in order to reduce the size of a gap 130, which is the insertion point of a cable into the cable support saddle 110. In order to arrange cables within the cable support saddle 110, the gap 130 is positioned between the retention leg 126 and the saddle support leg 108. In some embodiments, the gap 130 has a diameter that is less than the diameter of a cable being placed into the cable support saddle 110. The retention leg 126, along with the other components of the cable support saddle 110, can be deformed slightly in order to allow insertion and removal of cables in to the cable support saddle 110, but helps prevent inadvertent removal of the cables during inclement weather or adjustments.

In some embodiments, a solar panel cable and harness string cabling can be either #10 PV Cable, Ø0.27 in, or #8 awg PV Cable, Ø0.33 in. However larger cabling can be found on these power plants, and in some scenarios, the wire positioning device 100 can include a cable support saddle 110 large enough to support larger cables, which can get as large as Ø1.2 in. The wire positioning device 100 can be configured to hold more or less wires depending on the requirements of a deployed usage. For example, the cable support saddle 110 may be increased or decreased in size. The location of the cable support saddle 110 with respect to the attachment member 106 can also be modified depending on the application and/or use of the wire positioning device 100.

The wire positioning device 100 can be manufactured as one single piece, for example, through a C.N.C. wire form process. However, the wire positioning device 100 can be made using an extrusion and machining process. Additionally, for metallic materials, the wire positioning device 100 can be manufactured by a casting process, a progressive die stamping process, a four slide wire form process. The wire positioning device 100 can be manufactured from a variety of wire materials, such as aluminum, steel, galvanized steel, stainless steel, or copper. The wire positioning device 100 can also be made from thermoplastic materials using various manufacturing techniques such as injection molding or 3D printing.

Some implementations of the wire positioning device described herein can be listed to the UL safety Standard 1565-Positioning Devices, which provides the device with a mechanical load rating classification, operating temperature range classification, indoor/outdoor rating, and assess the smoothness of the saddle.

As depicted in FIG. 5-12, the wire positioning device 100 secures to a support structure 132, 144, such as a solar panel frame via a mounting hole 134, 146 arranged within the support structure 132, 144. However, other securement means can be used and can be considered, such as self-drilling screws, set screws, bolts and nuts, welding, adhesive tapes, or epoxy. Cable or wires 142 can be placed into the cable support saddle 110 of the wire positioning device 100. The open hook design of the attachment member 106 allows for quick installation with a single wire positioning device 100 and quick maintenance on a solar panel 136 or cabling 142, as the wire positioning device 100 can simply be rotated and removed from the support structures with a single hand, in a single motion.

As shown in FIG. 6, in some installation configurations, the attachment member 106 of the wire positioning device 100 can be installed into a hole 134 or slot 135 of the support structure 132 and then crimped closed to prevent movement in relatively large solar panel frame holes or slots, but other securement means can be used such as self-drilling screws, set screws, bolts and nuts, welding, adhesive tapes, or epoxy.

As depicted in FIGS. 5-12, the wire positioning device 100 is formed such that the cable support saddle 110 of the wire positioning device 100 is oriented 90° about the normal direction from the attachment member 106. This allows the wire positioning device 100 to be installed in the support structure 132, 144 while supporting the cable 142 in the direction of the cable run and parallel to the short edge of the support structure 132, 144, allowing for a straight, clean, cable installation, which is a requirement from the operators of the utility-scale solar power plant.

Figure 8:
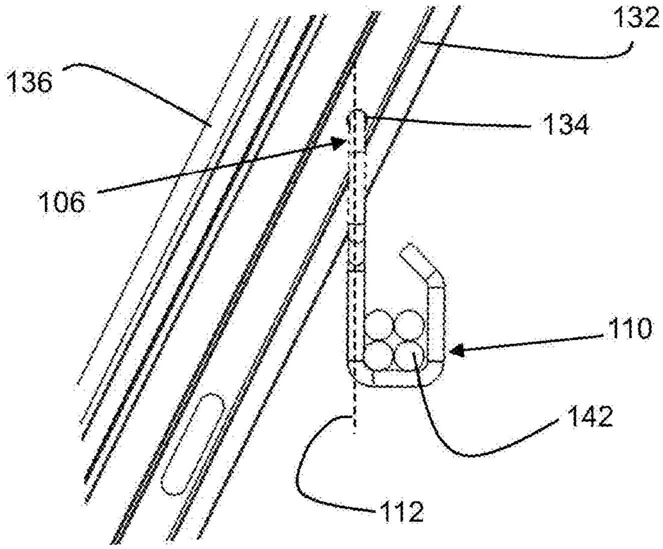
FIG. 8 is a detailed view of the wire positioning device of FIG. 7.
Figure 9:
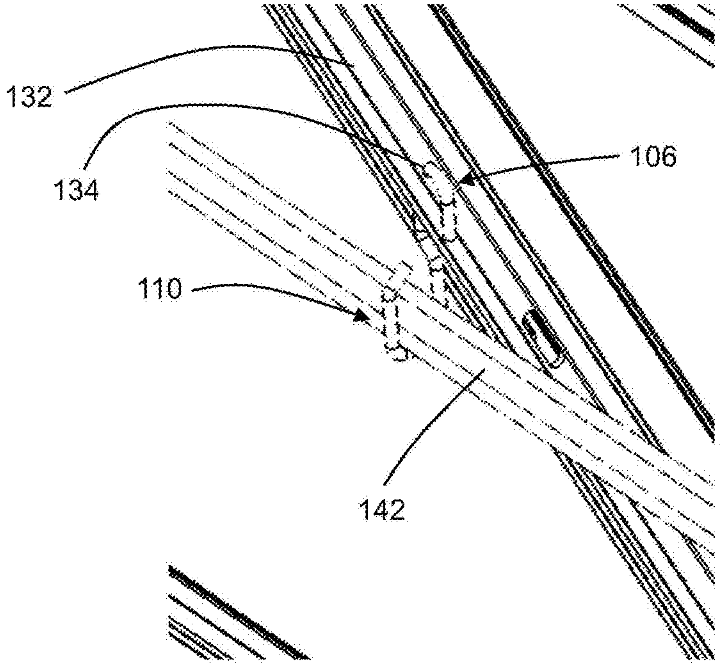
FIG. 9 is a perspective view of the assembly of FIG. 7.
Figure 10:
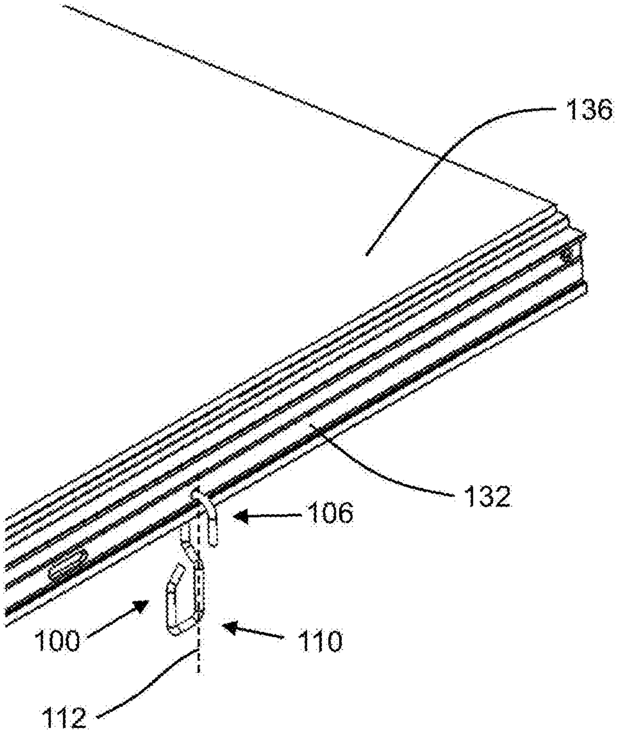
FIG. 10 is a perspective view illustrating the wire positioning device of FIG. 1 coupled to a solar panel frame.
Figure 12:
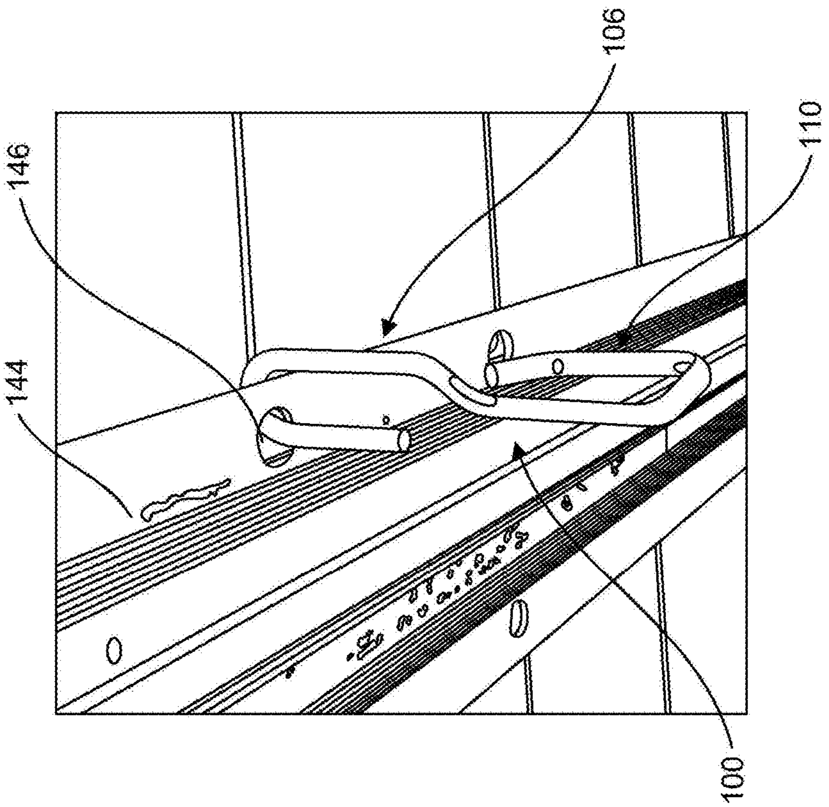
FIG. 12 is a perspective view illustrating the wire positioning device of FIG. 1 coupled to a solar panel frame.
Figure 11:
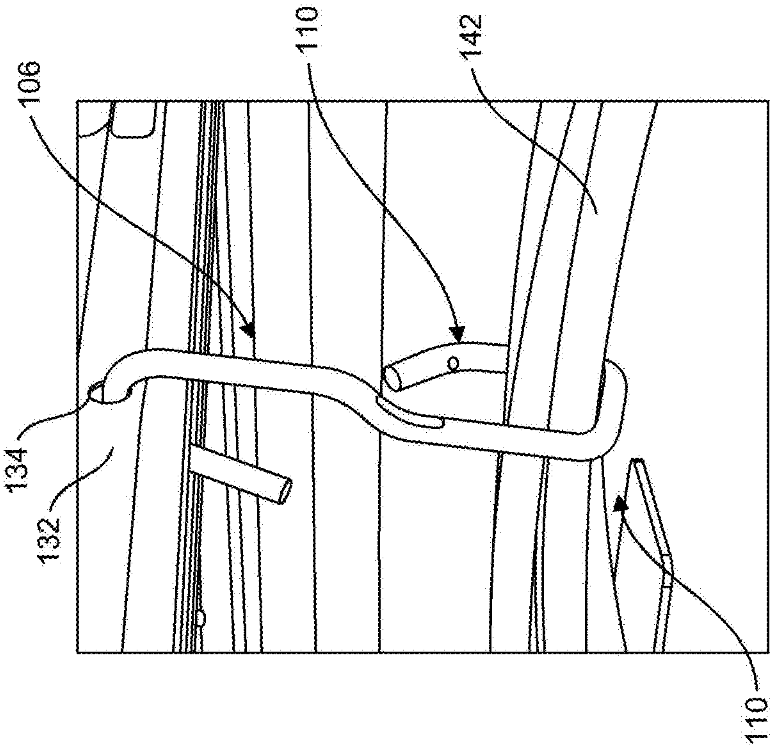
FIG. 11 is perspective views illustrating the wire positioning device of FIG. 1 coupled to a support structure and supporting cables.
Figure 14:
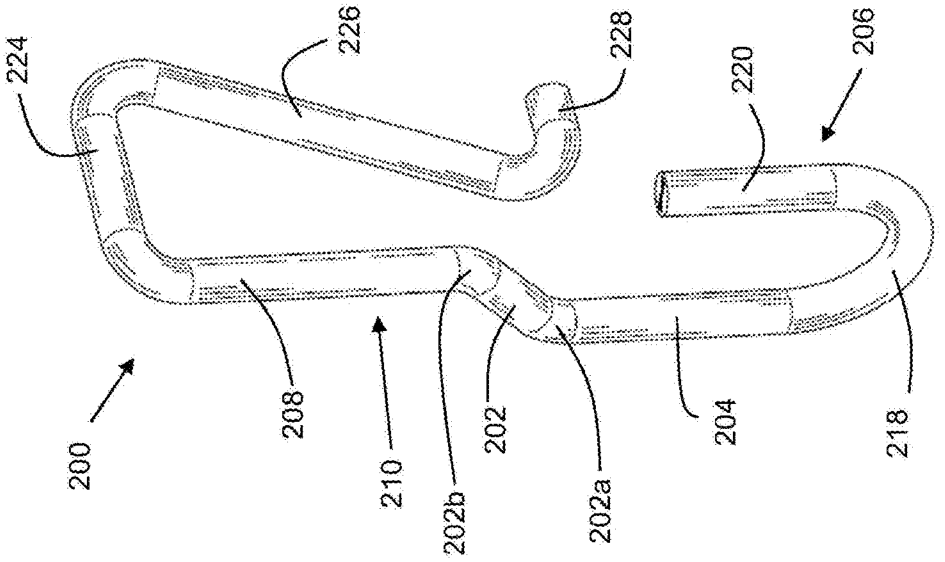
FIG. 14 is a bottom perspective view of the wire positioning device of FIG. 13.
Figure 13:
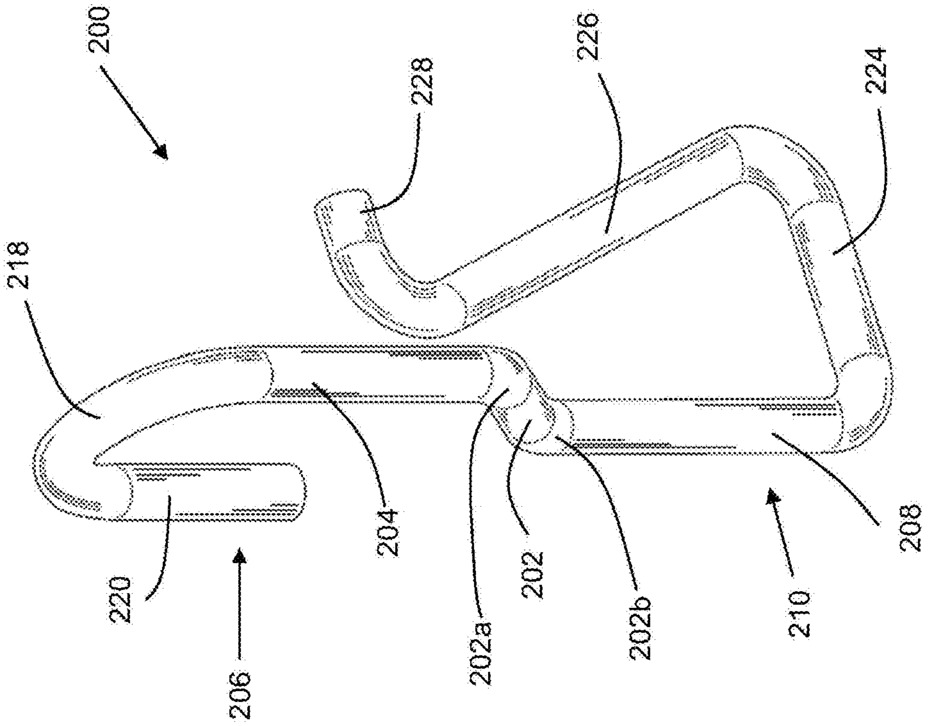
FIG. 13 is a top perspective view of one embodiment of a wire positioning device.
Figure 16:
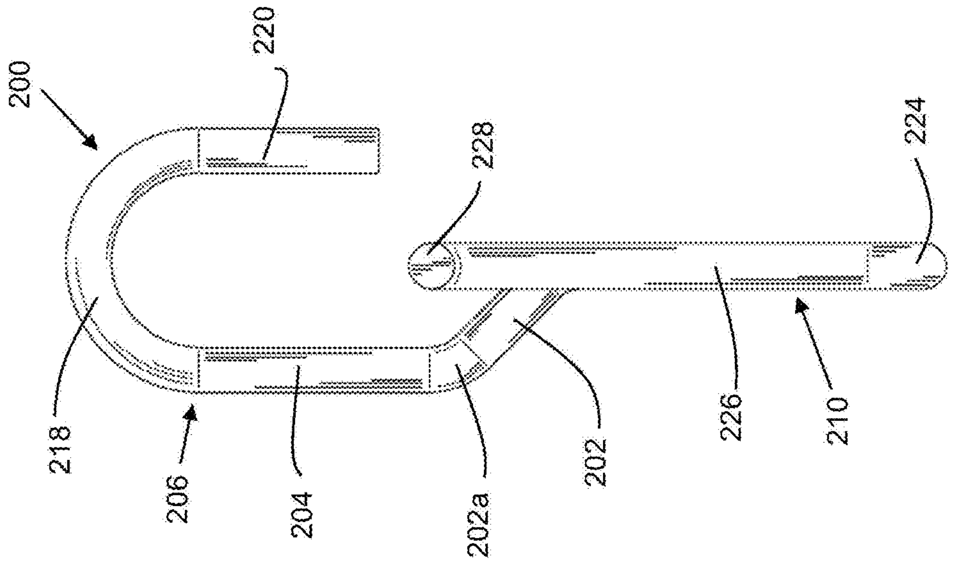
FIG. 16 is a back view of the wire positioning device of FIG. 13.
Figure 15:
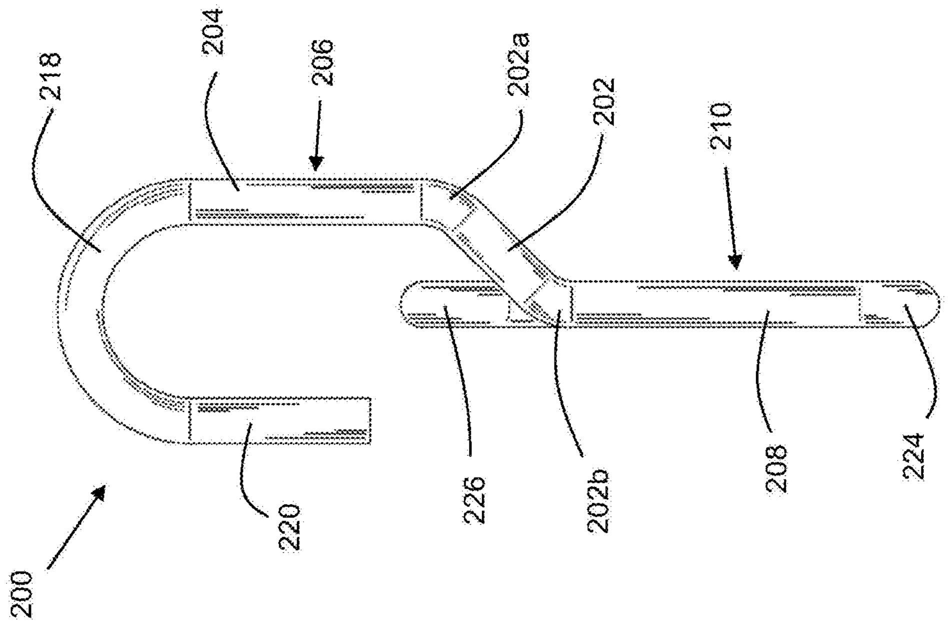
FIG. 15 is a front view of the wire positioning device of FIG. 13.
Figure 18:
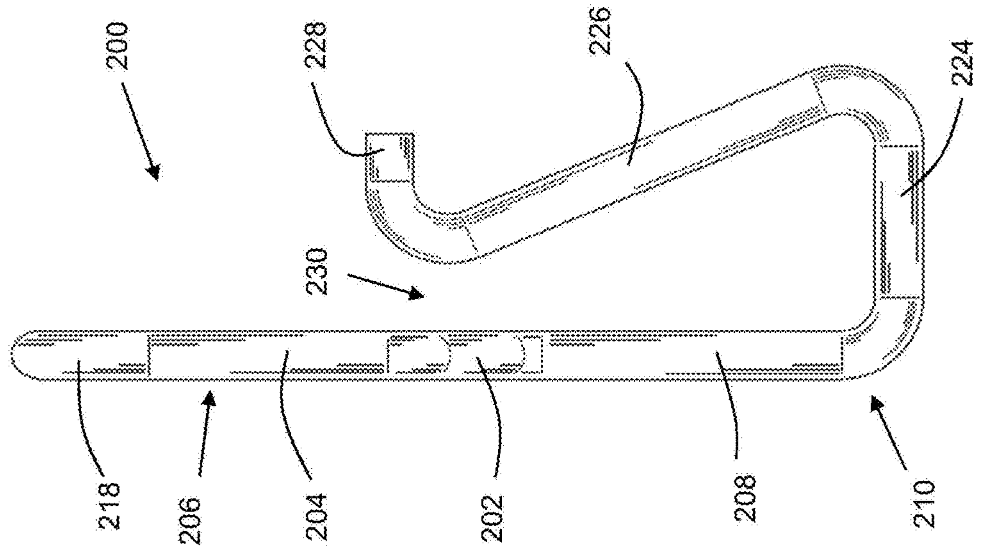
FIG. 18 is a right side view of the wire positioning device of FIG. 13.
Figure 17:
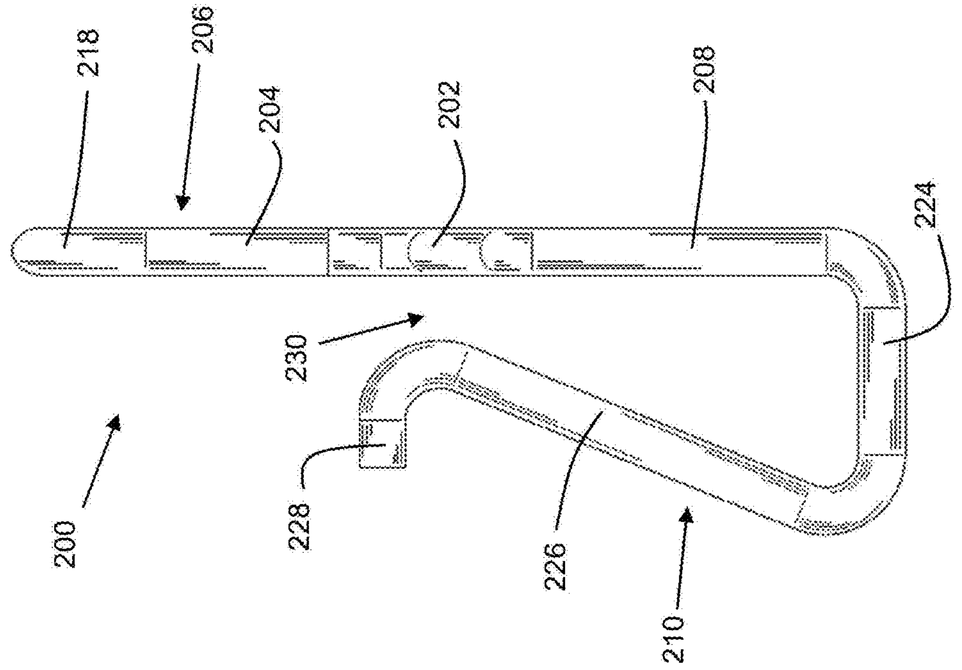
FIG. 17 is a left side view of the wire positioning device of FIG. 13.
Figure 19:
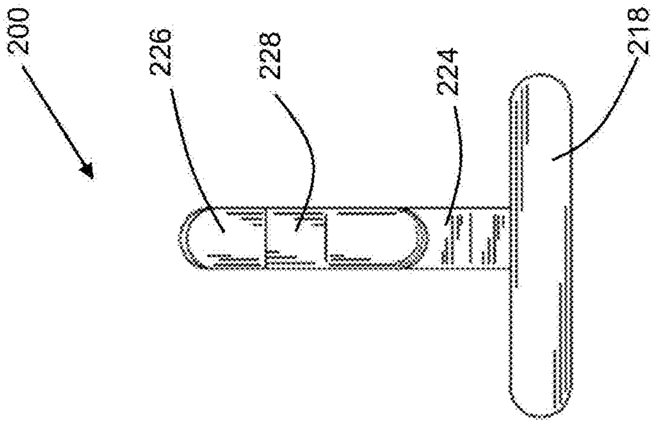
FIG. 19 is a top view of the wire positioning device of FIG. 13.
Figure 20:
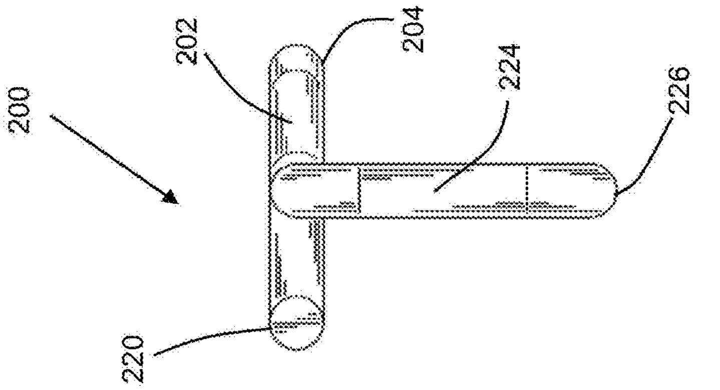
FIG. 20 is a bottom view of the wire positioning device of FIG. 13.
Figure 21:
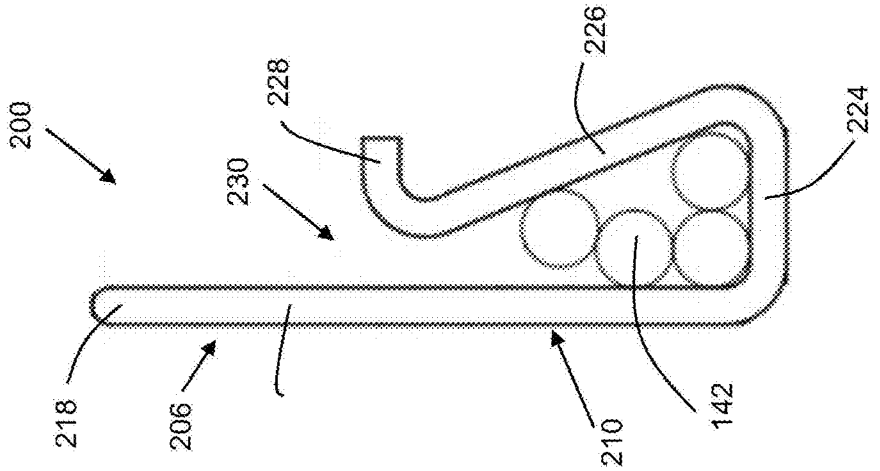
FIG. 21 is a right side view of the wire positioning device of FIG. 13 including cables arranged within the wire positioning device.
Figure 23:
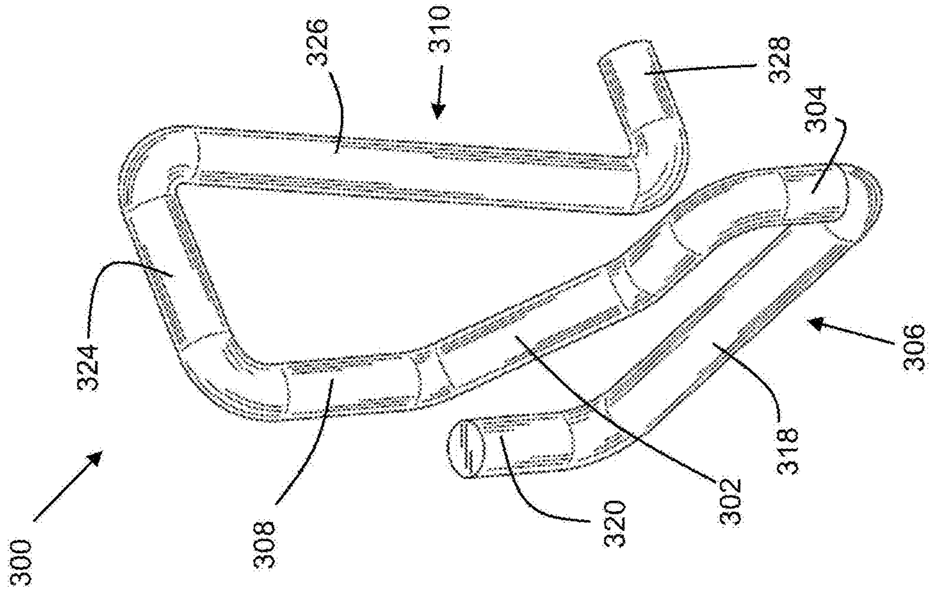
FIG. 23 is a bottom perspective view of the wire positioning device of FIG. 22.
Figure 22:
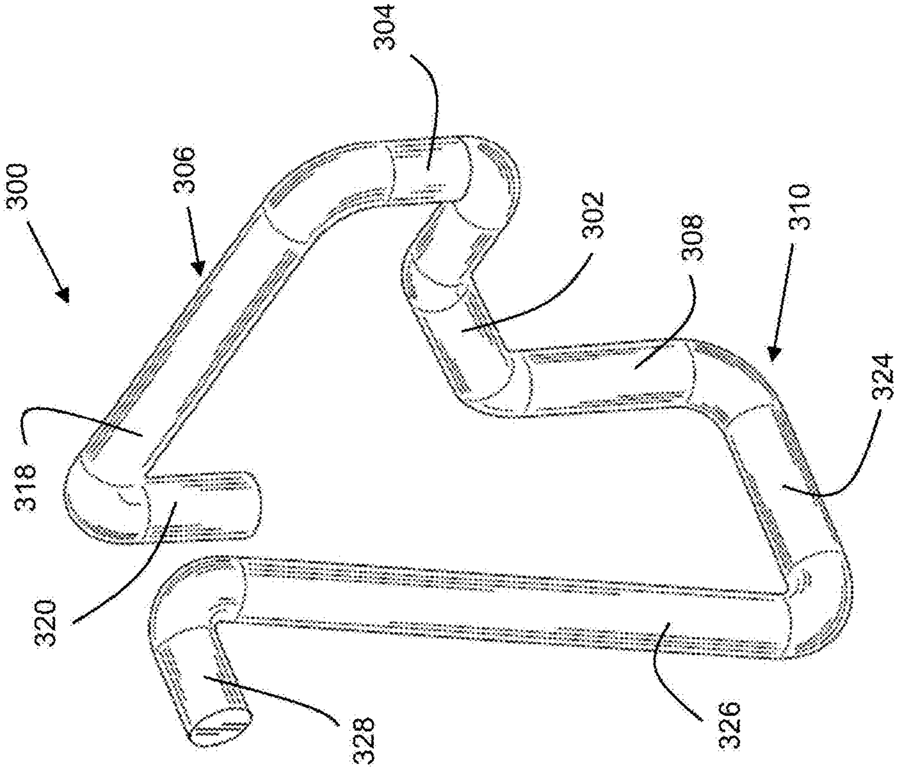
FIG. 22 is a top perspective view of one embodiment of a wire positioning device.
Figure 25:
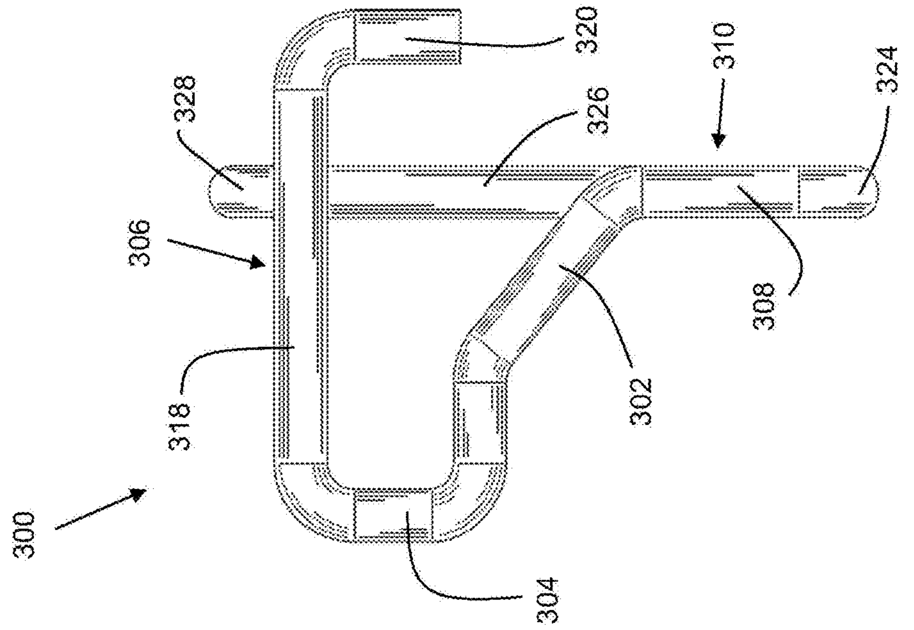
FIG. 25 is a back view of the wire positioning device of FIG. 22.
Figure 24:
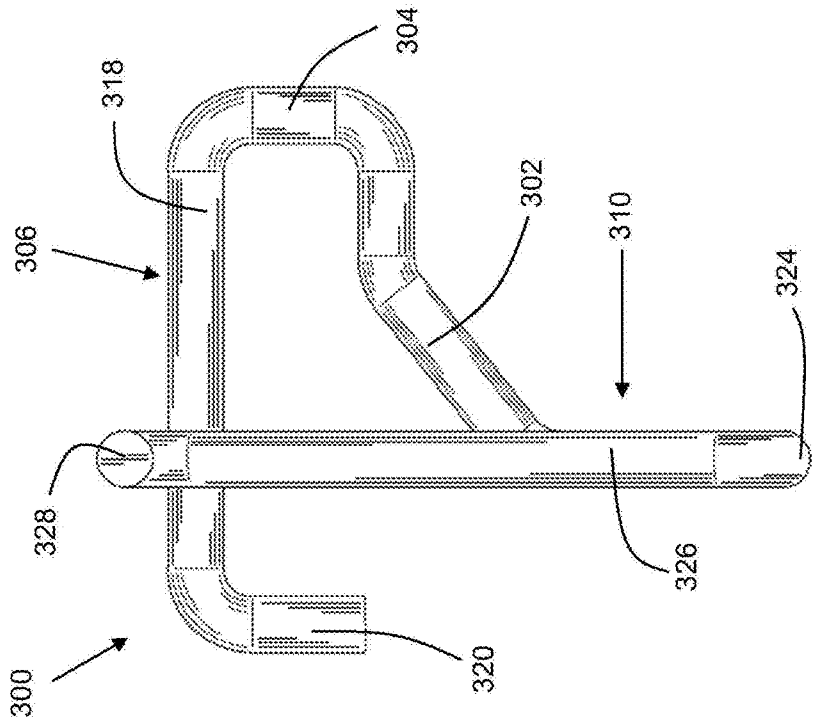
FIG. 24 is a front view of the wire positioning device of FIG. 22.
Figure 27:
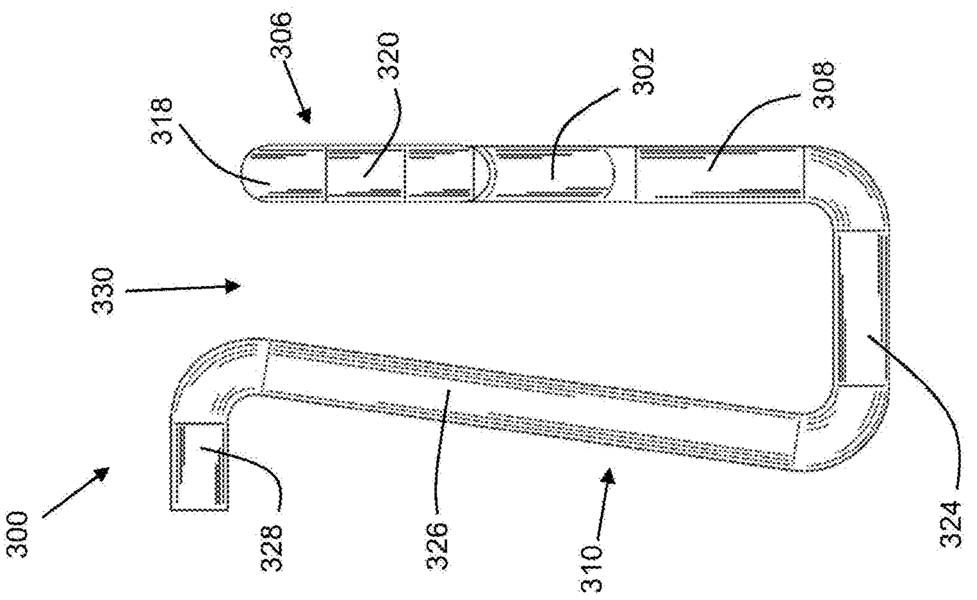
FIG. 27 is a right side view of the wire positioning device of FIG. 22.
Figure 26:
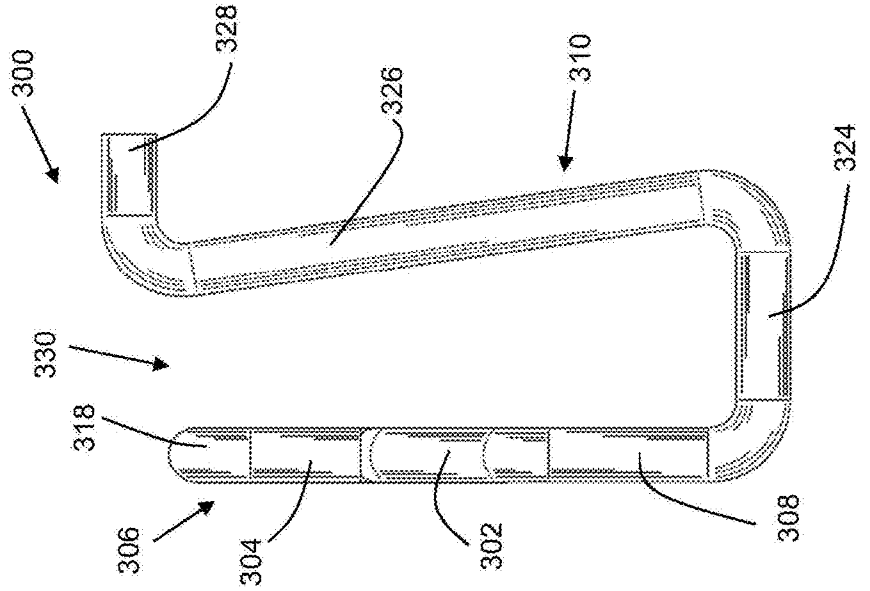
FIG. 26 is a left side view of the wire positioning device of FIG. 22.
Figure 30:
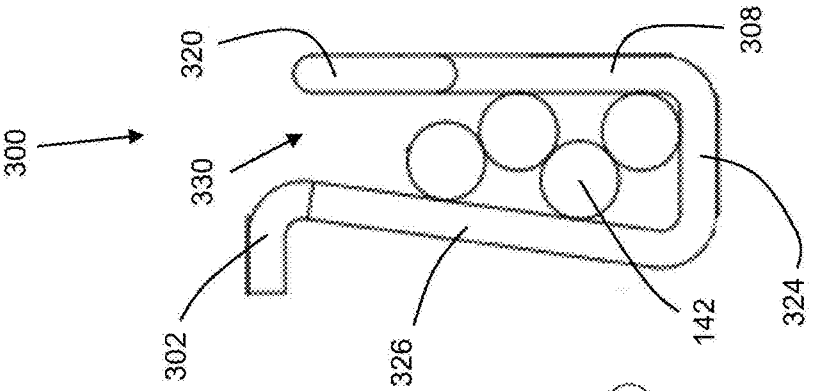
FIG. 30 is a right side view of the wire positioning device of FIG. 22 including cables arranged within the wire positioning device.
Figure 29:
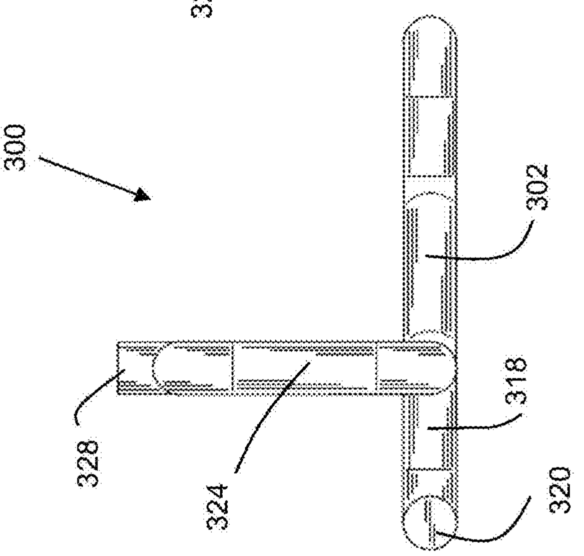
FIG. 29 is a bottom view of the wire positioning device of FIG. 22.
Figure 28:
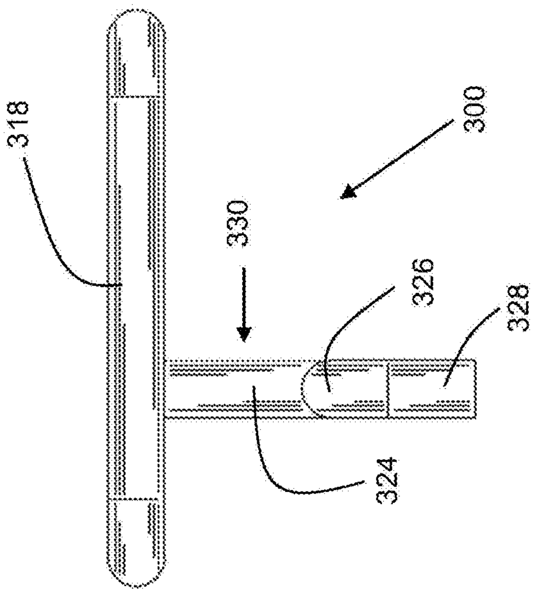
FIG. 28 is a top view of the wire positioning device of FIG. 22.

As shown in FIG. 8, the wire positioning device 100 is formed such that the cable support saddle 110 supports the cabling 142 in a clean manner that can be maintained, such that the positive cables can be stacked one side of the cable support saddle 110, and the negative cables can be stacked on the other side of the cable support saddle 110. In addition, cables 142 are aligned/stacked in the cable support saddle 110 so that a single cable can be accessed and removed from the cable support saddle 110 while leaving the remaining cables within the cable support saddle 110.

Types of support structures 132, 144 which the wire positioning device 100 can be coupled to include various solar panel frame types, such as a "Series 6 Solar Module" from First Solar, or a 72-cell c-Si (Crystalline silicon) Solar Module. Additionally, the support structures 132, 144 can be vertically-oriented structures, such as steel support beams, or solar tracker components, such as the clamps used to support the solar panels on the solar tracker, as shown in FIGS. 31-32.

FIGS. 13-21 depict another embodiment of a wire positioning device 200. It is noted that the wire positioning device 200 is similar to the wire positioning device 100. Therefore, similar elements of each device will not be described in detail. The wire positioning device 200 generally includes a center leg 202, an attachment support leg 204, an attachment member 206, a saddle support leg 208, and a cable support saddle 210. The attachment support leg 204 is arranged on the proximal end 202*a* of the center leg 102. In some embodiments, the attachment member 206 can be a hook including a bent portion 218 and a straight portion 220. The saddle support leg 208 is arranged on the distal end 202*b* of the center leg 102. The cable support saddle 210 includes a bottom leg 224 and a retention leg 226. The retention leg 226 includes a bent end section 228 arranged on an end opposite the bottom leg 224. Unlike the wire positioning device 100, the bent end section 228 extends outward at an angle away from the center leg 202 in order to create a smooth surface along the gap 230 for the insertion and removal of cables into the cable support saddle 210.

FIGS. 22-32 depict another embodiment of a wire positioning device 300. It is noted that the wire positioning device 300 is similar to the wire positioning device 100. Therefore, similar elements of each device will not be described in detail. The wire positioning device 300 generally includes a center leg 302, an attachment support leg 304, an attachment member 306, a saddle support leg 308, and a cable support saddle 310. In some embodiments, the attachment member 306 can be a hook including an extension portion 318 and an end portion 320. The cable support saddle 310 includes a bottom leg 324 and a retention leg 326. The retention leg 326 includes a bent end section 328 arranged on an end opposite the bottom leg 324. Unlike the wire positioning device 100, the bent end section 328 extends outward at an angle away from the center leg 302 in order to create a smooth surface along the gap 330 for the insertion and removal of cables into the cable support saddle 310. Additionally, a portion of the bent end section 328 extends upward past the attachment member 306.

Figure 31:
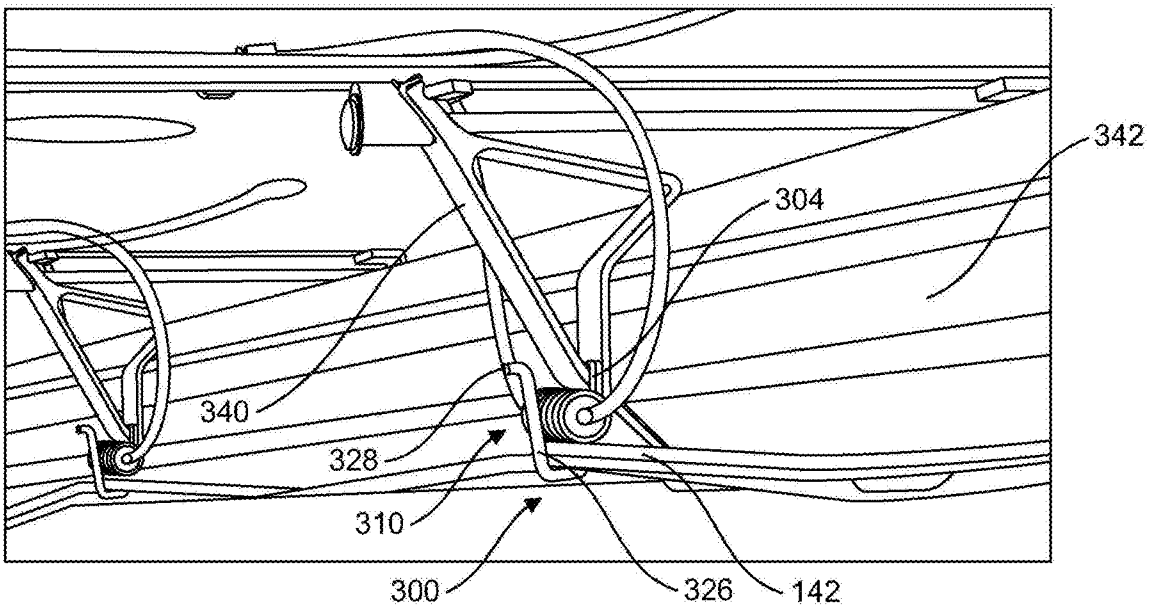
FIG. 31 is a perspective view of the wire positioning device of FIG. 22 attached to a support structure and supporting a cable.
Figure 32:
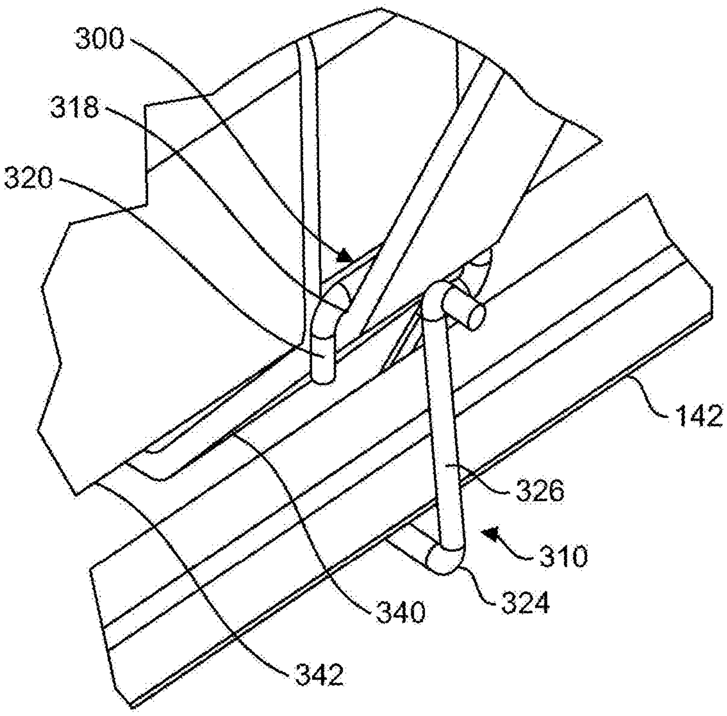
FIG. 32 is a perspective view of the wire positioning device of FIG. 22 attached to a support structure and supporting a cable.

As depicted in FIGS. 31-32, the attachment member 306 is positioned on a bracket 340 instead of a through-bore in a support structure. The bracket 340 is coupled to a support structure 342, such as torque tube. Due to the design of the attachment member 306, the extension portion 318 extends along a top surface of the bracket 340, and claps around the end of the bracket 340 using the end portion 320. The attachment member 306 partially encloses the bracket 340 using the extension portion 318, the end portion 320, and the attachment support leg 304.

Figure 33:
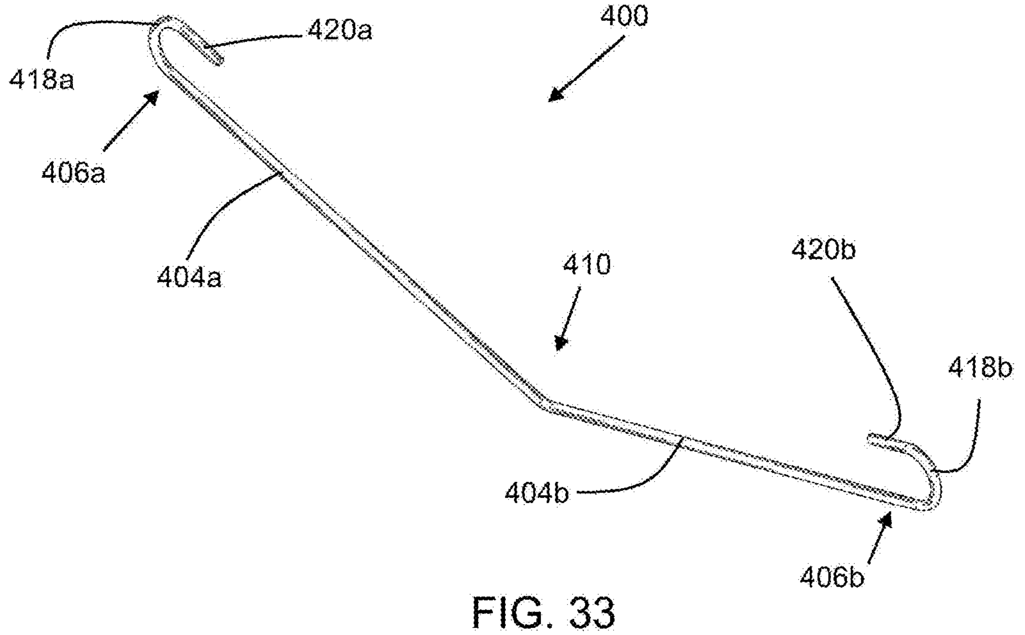
FIG. 33 is a top perspective view of one embodiment of a wire positioning device.
Figure 34:
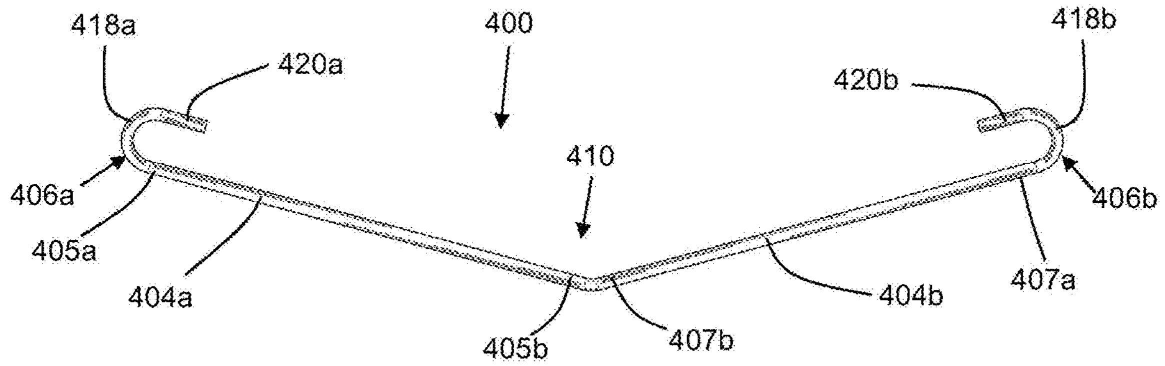
FIG. 34 is a front view of the wire positioning device of FIG. 33.
Figure 35:
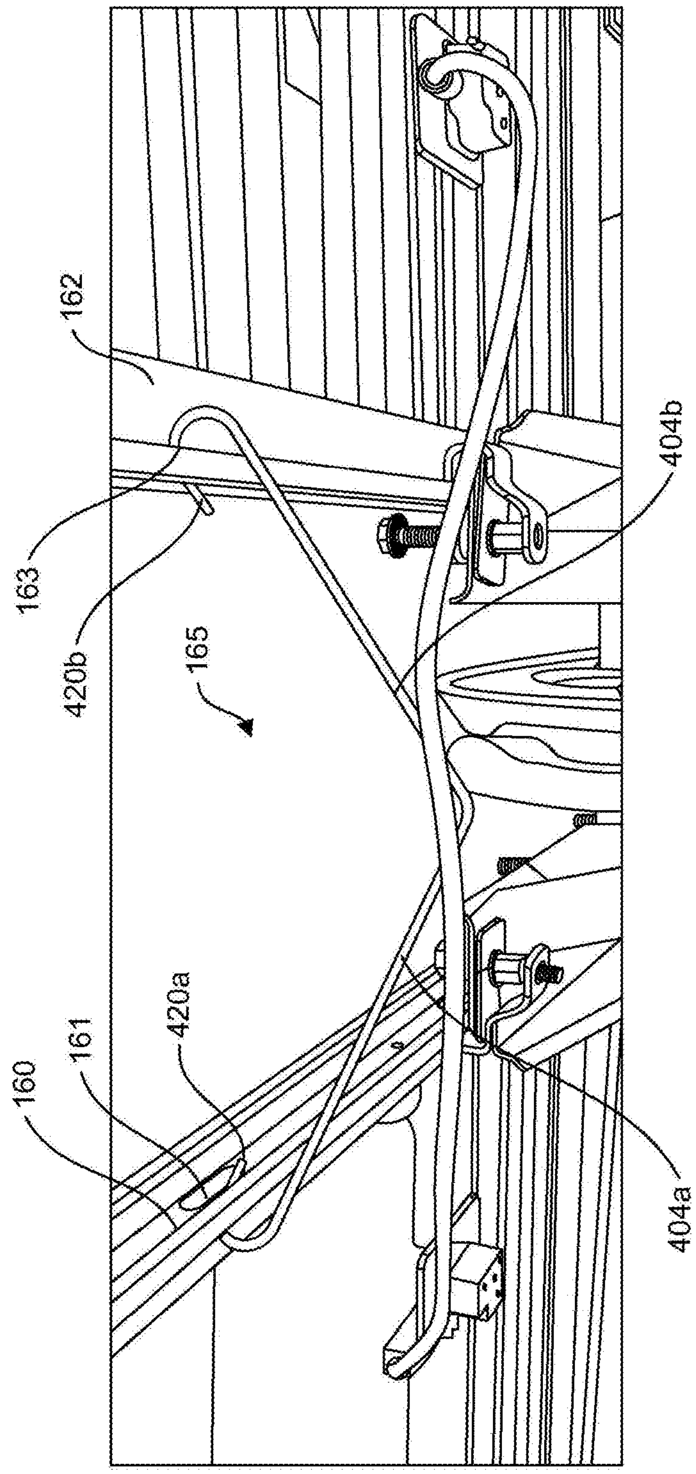
FIG. 35 is a perspective view of the wire positioning device of FIG. 33 attached to support structures.
Figure 37:
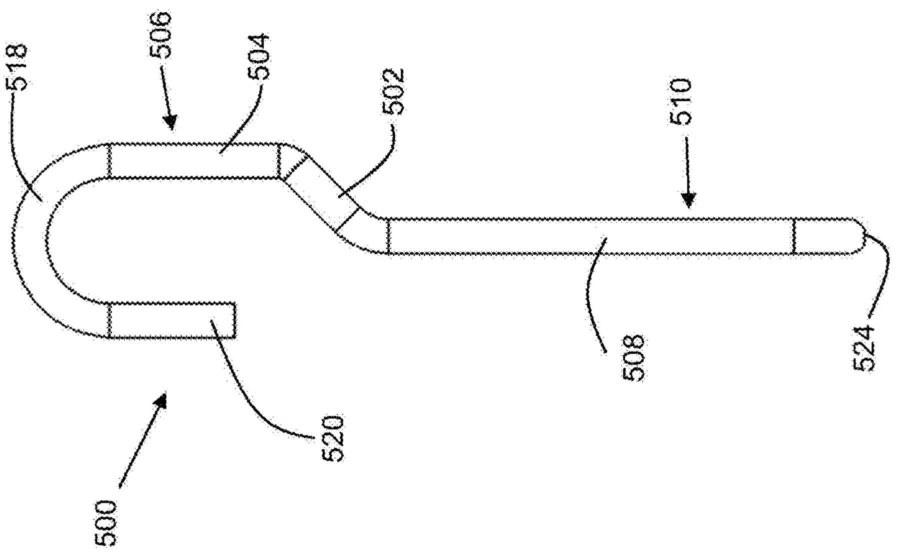
FIG. 37 is a front view of the wire positioning device of FIG. 36.
Figure 36:
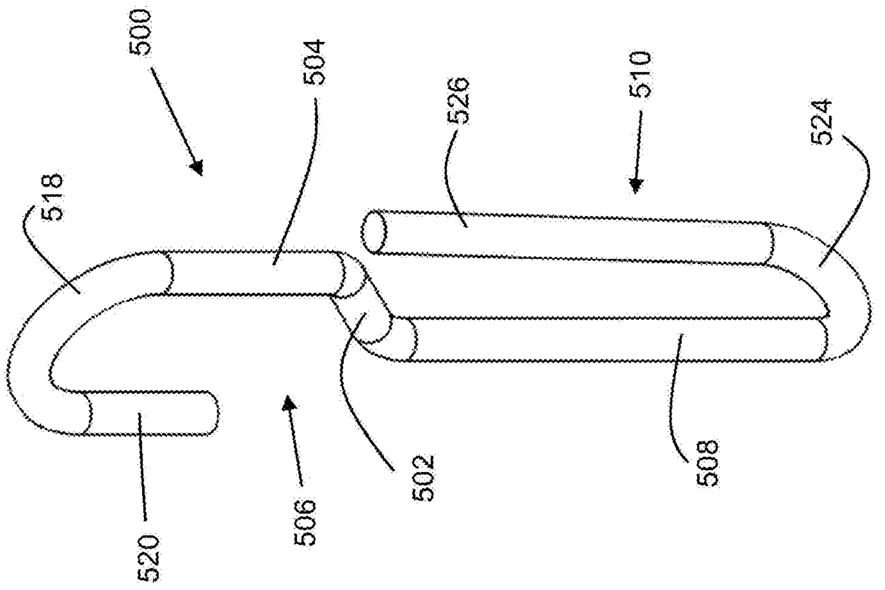
FIG. 36 is a top perspective view of one embodiment of a wire positioning device.
Figure 39:
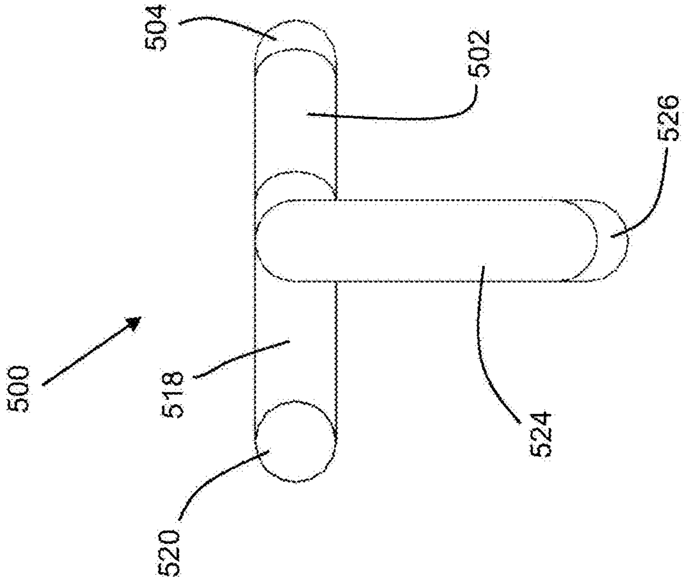
FIG. 39 is a bottom view of the wire positioning device of FIG. 36.
Figure 38:
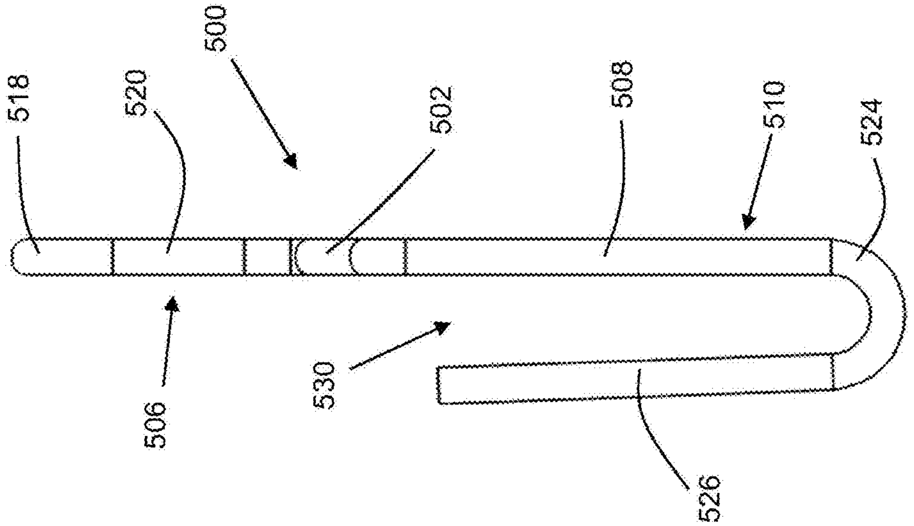
FIG. 38 is a left side view of the wire positioning device of FIG. 36.
Figure 41:
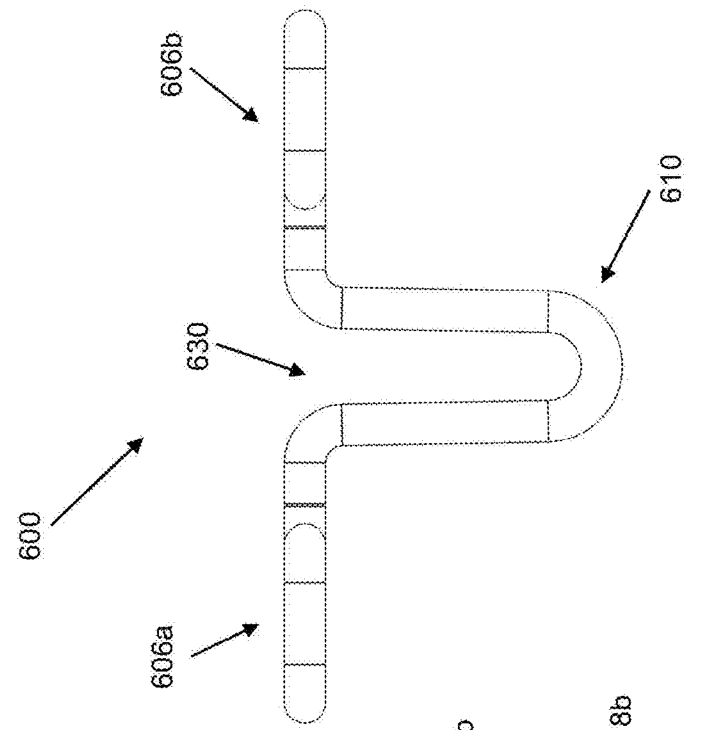
FIG. 41 is a front view of the wire positioning device of FIG. 40.

FIGS. 33-35 depict another embodiment of a wire positioning device 400. The wire positioning device 400 is configured to support cables 142 along a gap 165 between two separate support structures 160, 162. The wire positioning device 400 generally includes a first attachment support leg 404*a* having a distal end 405*a* and a proximal end 405*b*. A first attachment member 406*a* is arranged on the distal end 405*a* of the first attachment support leg 404*a*, and is configured to couple the wire positioning device 400 to the support structure 160. The first attachment member 406*a* can be a hook including a bent portion 418*a* and a straight portion 420*a*. The straight portion 420*a* can be positioned within a hole 161 of the support structure 160. Additionally, the wire positioning device 400 includes a second attachment support leg 404*b* having a distal end 407*a* and a proximal end 407*b*. A second attachment member 406*b* is arranged on the distal end 407*a* of the second attachment support leg 404*b*, and is configured to couple the wire positioning device 400 to the second support structure 162. The second attachment member 406*b* can be a hook including a bent portion 418*b* and a straight portion 420*b*. The straight portion 420*b* can be positioned within a hole 163 of the support structure 162. The first attachment support leg 404*a* is coupled to the second attachment support leg 404*b* at each proximal end 405*b*, 407*b*. With the first attachment support leg 404*a* coupled to the second attachment support leg 404*b*, a cable support saddle 410 is formed to bridge the gap 165 between the support structures 160, 162 in order to support the at least one cable 142. In an exemplary embodiment, as depicted in FIG. 4, first attachment support leg 404*a* and the second attachment support leg 404*b* can be arranged at an angle relative to one another. In certain embodiments, the angle is within a range 1-180 degrees, or within the range of 10-170 degrees, or within the range of 90-145 degrees.

FIGS. 36-39 depict another embodiment of a wire positioning device 500. It is noted that the wire positioning device 500 is similar to the wire positioning device 100. Therefore, similar elements of each device will not be described in detail. The wire positioning device 500 generally includes a center leg 502, an attachment support leg 504, an attachment member 506, a saddle support leg 508, and a cable support saddle 510. In some embodiments, the attachment member 506 can be a hook including a bent portion 518 and a straight portion 520. The cable support saddle 510 includes a bottom leg 524 and a retention leg 526. Unlike the wire positioning device 100, the retention leg 526 does not include a bent end section arranged on an end opposite the bottom leg 524. Instead, the retention leg 526 is a substantially straight member which is set at an angle relative to the saddle support leg 508 such that the retention leg 526 extends outward at an angle away from the saddle support leg 208 to make the insertion of cables within the gap 530 easier.

FIGS. 40-43 depict another embodiment of a wire positioning device 600. It is noted that the wire positioning device 600 is similar to the wire positioning device 100. Therefore, similar elements of each device will not be described in detail. The wire positioning device 600 generally includes a first center leg 602*a*, a first attachment support leg 604*a*, a first attachment member 606*a*, a first saddle support leg 608*a*, a cable support saddle 610, a second center leg 602*b*, a second attachment support leg 604*b*, a second attachment member 606*b*, and a second saddle support leg 608*b*. In some embodiments, the first and second attachment members 606*a*, 606*b* can be hooks including extension portions 618*a*, 618*b* and end portions 620*a*, 620*b*. The cable support saddle 610 includes a bottom leg 624 and retention legs 626*a*, 626*b*. The retention legs 626*a*, 626*b* connect to the bottom leg 624. Each of the attachment members 606*a*, 606*b* include an extension portion 618*a*, 618*b* extending from the attachment support legs 604*a*, 604*b*, with each extension portion 618*a*, 618*b* having an end portion 620*a*, 620*b* to secure the wire positioning device 600 to a support structure.

FIGS. 44-47 depict another embodiment of a wire positioning device 700. It is noted that the wire positioning device 700 is similar to the wire positioning device 100. Therefore, similar elements of each device will not be described in detail. The wire positioning device 700 generally includes a center leg 702, an attachment support leg 704, an attachment member 706, a saddle support leg 708, and a cable support saddle 710. In some embodiments, the attachment member 706 can be a hook including a bent portion 718 and an end portion 720. Unlike the wire positioning device 100, the end portion 720 can be arranged at an acute angle relative to the bent portion 718 to allow the attachment member 706 to hook into a feature of a support structure. The cable support saddle 710 includes a bottom leg 724 and a retention leg 726. The retention leg 726 includes a bent end section 728 arranged on an end opposite the bottom leg 724. The bent end section 728 extends outward at an angle away from the center leg 702 in order to create a smooth surface along the gap 730 for the insertion and removal of cables into the cable support saddle 710.

FIGS. 48-51 depict another embodiment of a wire positioning device 800. It is noted that the wire positioning device 800 is similar to the wire positioning device 300. Therefore, similar elements of each device will not be described in detail. The wire positioning device 800 generally includes a center leg 802, an attachment support leg 804, an attachment member 806, a saddle support leg 808, and a cable support saddle 810. In some embodiments, the attachment member 806 can be a hook including an extension portion 818 and an end portion 820. The attachment member 806 attaches to a support structure substantially similar to the wire positioning device 300. The cable support saddle 810 includes a bottom leg 824 and a retention leg 826. The retention leg 826 includes a bent end section 828 arranged on an end opposite the bottom leg 824. The bent end section 828 extends outward at an angle away from the center leg 802 in order to create a smooth surface along the gap 830 for the insertion and removal of cables into the cable support saddle 810.

FIGS. 52-55*b* depict another embodiment of a wire positioning device 900. It is noted that the wire positioning device 900 is similar to the wire positioning device 800. Therefore, similar elements of each device will not be described in detail. The wire positioning device 900 generally includes a center leg 902, an attachment support leg 904, an attachment member 906, a saddle support leg 908, and a cable support saddle 910. In some embodiments, the attachment member 906 can be a hook including an extension portion 918. The extension portion 918 is configured to couple the wire positioning device 900 to a support structure substantially similar to the wire positioning device 800, by inserting the extension portion 918, into a through-bore and performing a bending operation, for example with a hand-operated pair of pliers, to bend the end of the extension portion 918 by at least 45° to prevent the wire positioning device 900 from being removed from the support structure. The extension portion 918 can be bent back into a straight positioning and removed if necessary for solar panel maintenance and repairs. The cable support saddle 910 includes a bottom leg 924 and a retention leg 926. The retention leg 926 includes a bent end section 928 arranged on an end opposite the bottom leg 924. The bent end section 928 extends outward at an angle away from the center leg 902 in order to create a smooth surface along the gap 930 for the insertion and removal of cables into the cable support saddle 910.

FIGS. 56-59 depict another embodiment of a wire positioning device 1000. It is noted that the wire positioning device 1000 is similar to the wire positioning device 600. Therefore, similar elements of each device will not be described in detail. The wire positioning device 1000 generally includes a first center leg 1002*a*, a first attachment support leg 1004*a*, a first attachment member 1006*a*, a first saddle support leg 1008*a*, a cable support saddle 1010, a second center leg 1002*b*, a second attachment support leg 1004*b*, a second attachment member 1006*b*, and a second saddle support leg 1008*b*. In some embodiments, the first and second attachment members 1006*a*, 1006*b* can be a hook including bent portions 1018*a*, 1018*b*. The cable support saddle 1010 includes bottom legs 1024*a*, 1024*b* and retention legs 1026*a*, 1026*b*. The retention legs 1026*a*, 1026*b* connect to the bottom legs 1024*a*, 1024*b* and an end section 1028. Each of the attachment members 1006*a*, 1006*b* include an bent portion 1018*a*, 1018*b* extending from the attachment support legs 1004*a*, 1004*b*, with each bent portion 1018*a*, 1018*b* being configured to secure the wire positioning device 1000 to a support structure.

FIGS. 60-64 depict additional embodiments of a wire positioning devices 1100, 1200, 1300, 1400, 1500. It is noted that the wire positioning devices 1100, 1200, 1300, 1400, 1500 are similar to the wire positioning device 100. Therefore, similar elements of each device will not be described in detail. As shown in FIGS. 60-64, the wire positioning devices can be formed such that the saddle can be configured to be a different size, shape, and/or position. For example, the saddle can be designed for different amounts of cables or for different sized cables. Additionally, the saddle can be designed such that the saddle provides a tight fit around the cables so that the saddle provides a "grip" on the cables, allowing the length of cable can be adjusted on either side of the device. Even further, the device can be formed such that there more than one saddle that could be of different shape and sizes to support various amounts of cables and cable sizes. Furthermore, the hook portion of the device can be a different size and/or position to accommodate different installation scenarios, such as a unique solar panel frame that would require a different hook geometry.

As depicted in FIGS. 60-64, the wire positioning device 1100 includes an attachment member 1106 and a cable saddle support 1110 similar to the wire positioning device 100. The wire positioning device 1200 includes an attachment member 1206 and a circular cable saddle support 1210. The wire positioning device 1300 includes an attachment member 1306 and a rectangular cable saddle support 1310. The wire positioning device 1400 includes an attachment member 1406 and a triangular cable saddle support 1410. The wire positioning device 1500 includes an attachment member 1506 and a first rectangular cable saddle support 1510, and a second rectangular cable saddle support 1512, which can be configured to separate specific cables supported by the wire positioning device 1500.

Figure 65A:
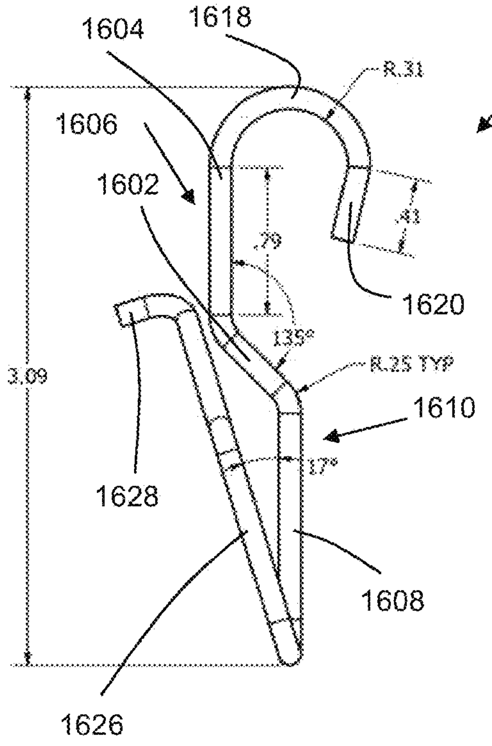
FIG. 65*a* is a front view of one embodiment of a wire positioning device.
Figure 65B:
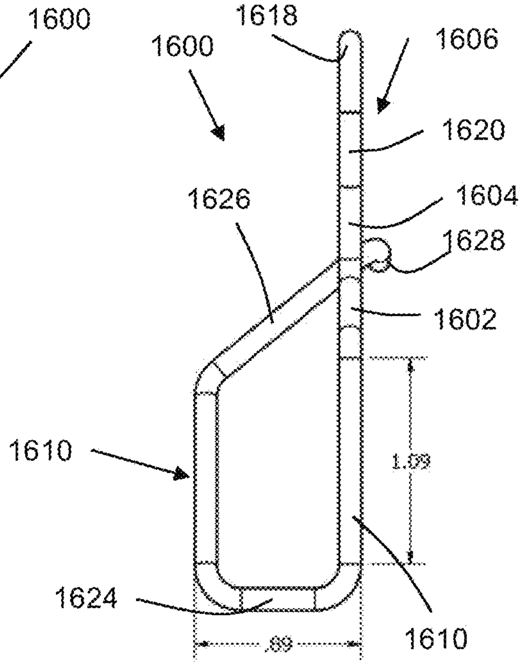
FIG. 65*b* is a left side view of the wire positioning device of FIG. 65*a;*
Figure 65C:
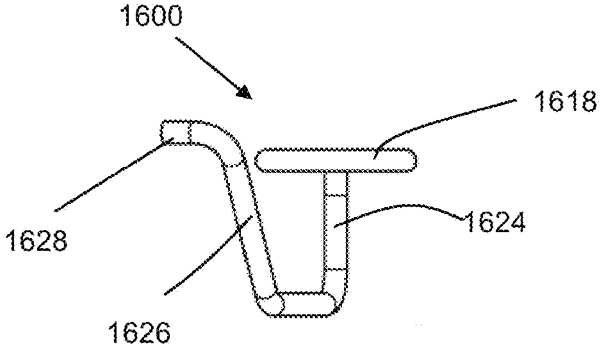
FIG. 65*c* is a bottom view of the wire positioning device of FIG. 65*a;*
Figure 66:
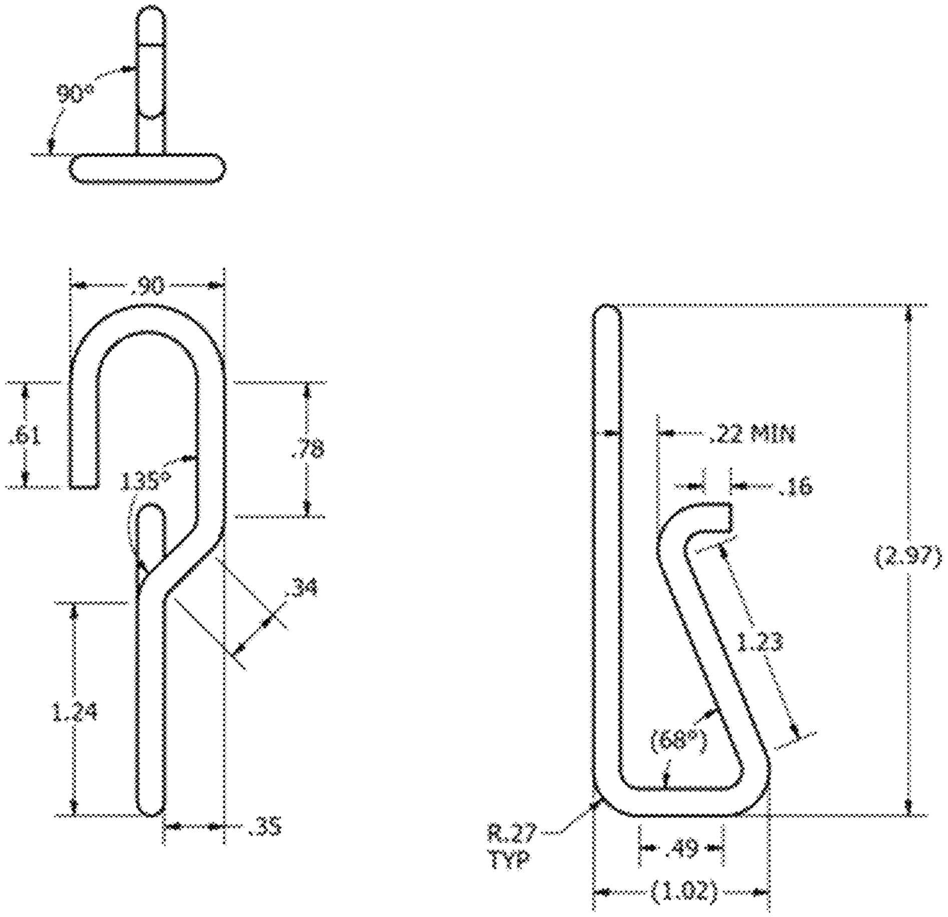
FIGS. 66-74 illustrate schematic views of embodiments of wire positioning devices including various dimensions.
Figure 67:
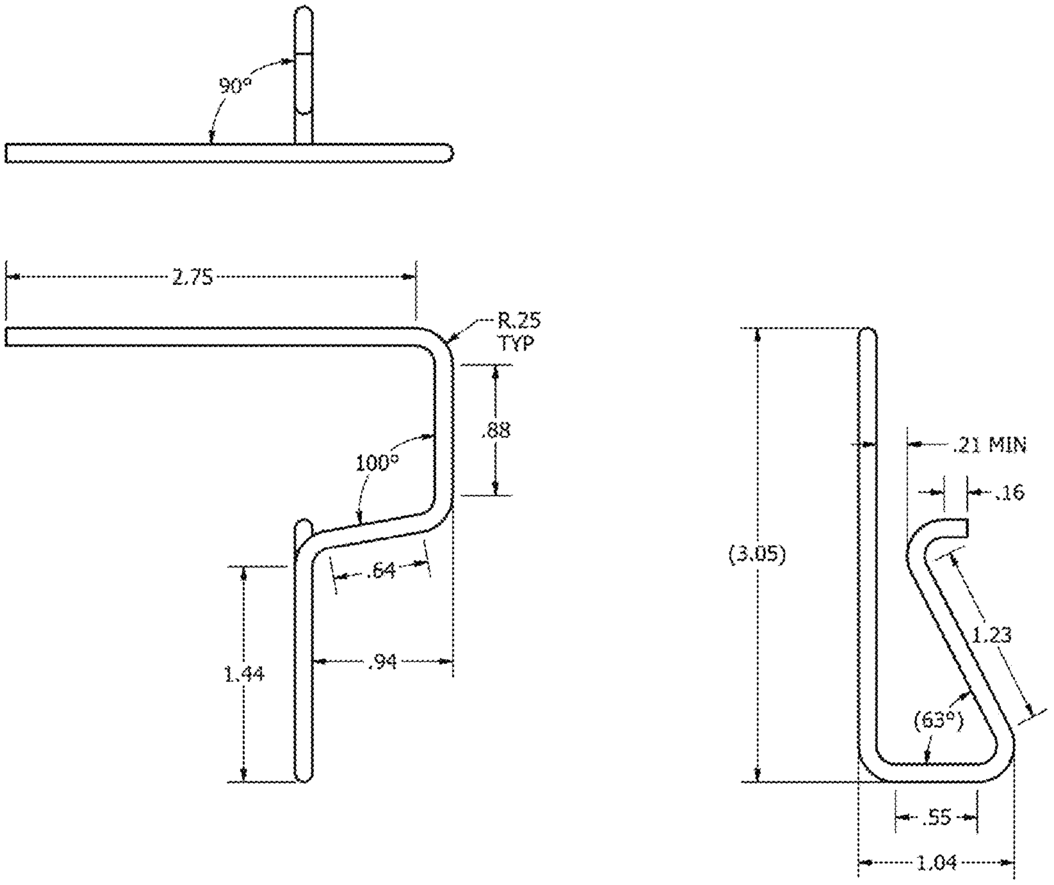
Figure 68:
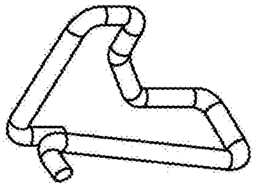
Figure 68:
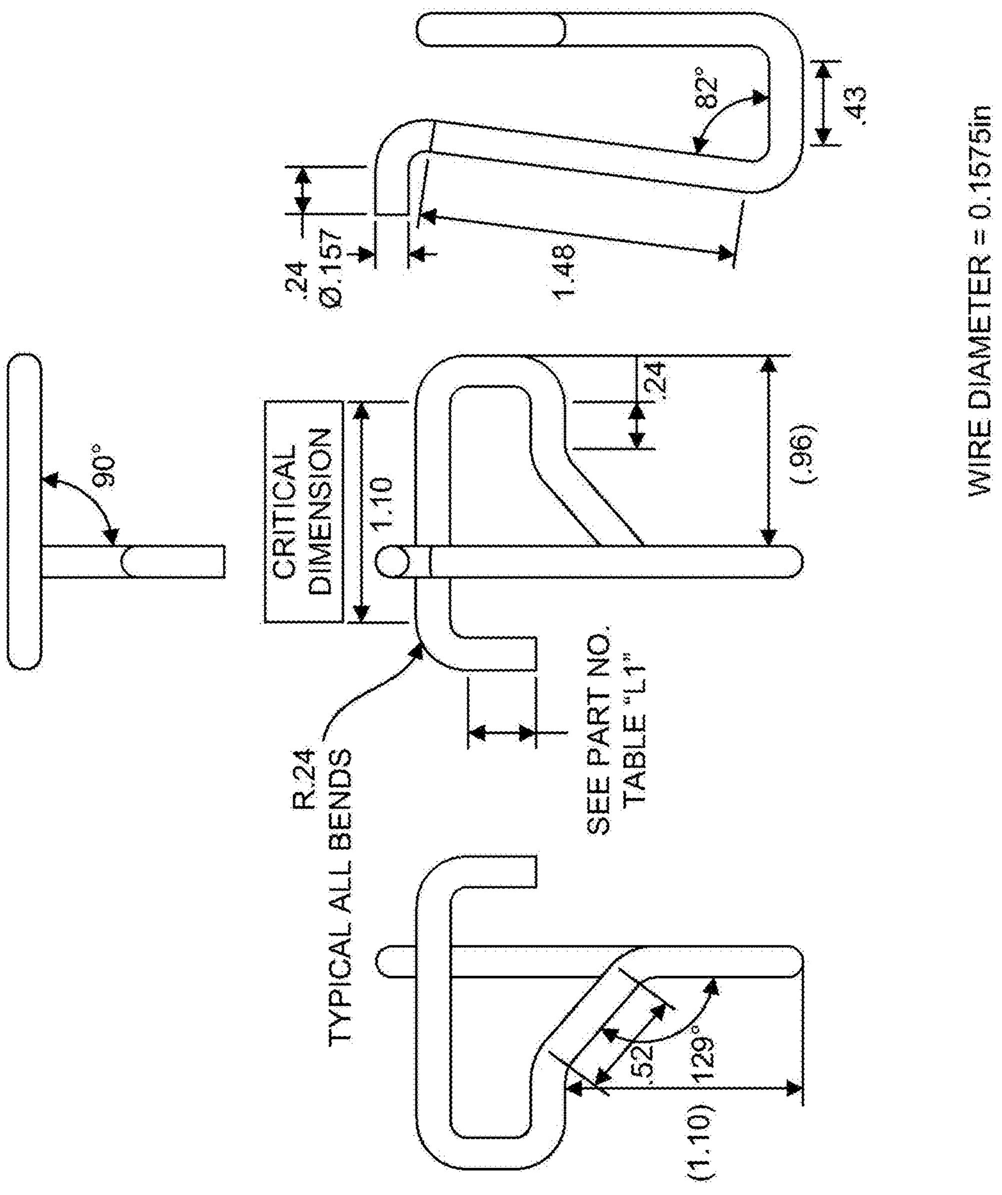
Figure 69:
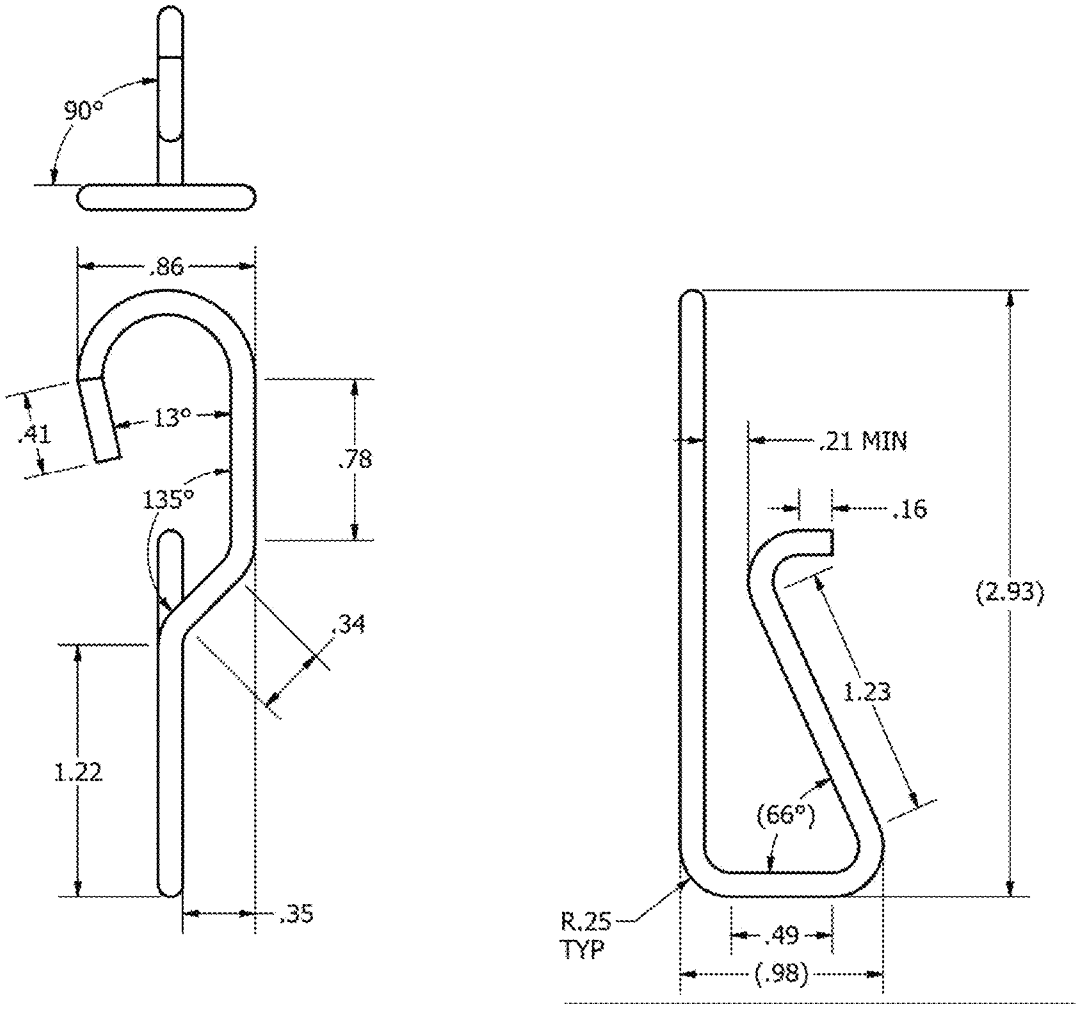
Figure 70:
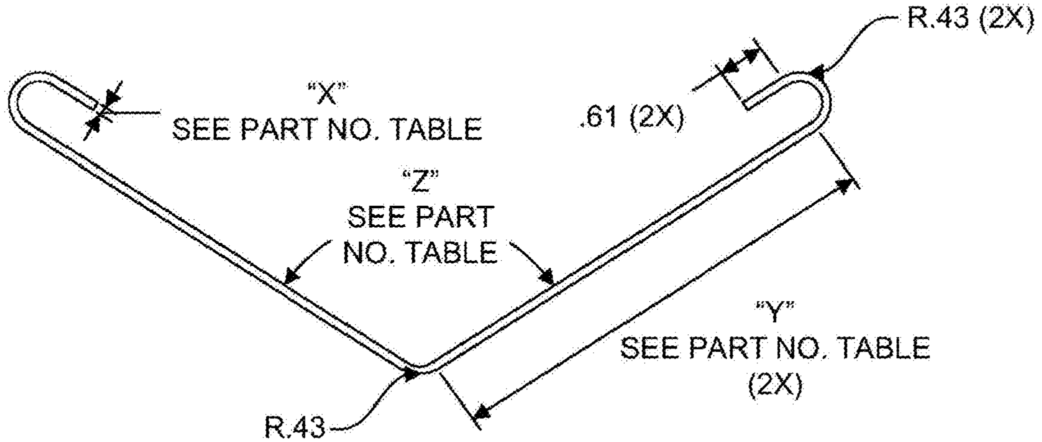

FIGS. 65*a*-65*c* depict another embodiment of a wire positioning device 1600. It is noted that the wire positioning device 1600 is similar to the wire positioning device 100. Therefore, similar elements of each device will not be described in detail.

The wire positioning device 1600 generally includes a center leg 1602, an attachment support leg 1604, an attachment member 1606, a saddle support leg 1608, and a cable support saddle 1610. The attachment support leg 1604 is arranged on the proximal end of the center leg 1602. In some embodiments, the attachment member 1604 can be a hook including a bent portion 1618 and a straight portion 1620. The saddle support leg 1608 is arranged on the distal end of the center leg 1602. The cable support saddle 1610 includes a bottom leg 1624 and a retention leg 1626. The retention leg 1626 includes a bent end section 1628 arranged on an end opposite the bottom leg 1624. Unlike the wire positioning device 100, the retention leg 1626 is bent past the center leg 1602. In use, the solar panel cabling and harness string cabling must be temporary turned 90° deg of its long edge it be inserted into the retention leg 1626, once the cable is inserted it can be turned back to its natural-resting position, the retention leg 1626 is closed off (as shown on the FIG. 65*b*) preventing cables from dislodging out of the cable saddle 1610, but still leaving an open-access design if the cables need to be removed, they can be temporary turned 90° and lifted out of the opening between the retention leg 1626 and the center leg 1602. It is noted that various dimensions for the wire portioning device 1600 are illustrated on the FIGS. 65*a*-65*c*, and these dimensions can vary up to +/−35% their stated value.

FIGS. 66-74 illustrate schematic views of embodiments of wire positioning devices disclosed herein. The FIGS. 66-74 include various dimensions of the components of the wire positioning devices The illustrated dimension can vary +/−35% from the stated value.

Figure 71:
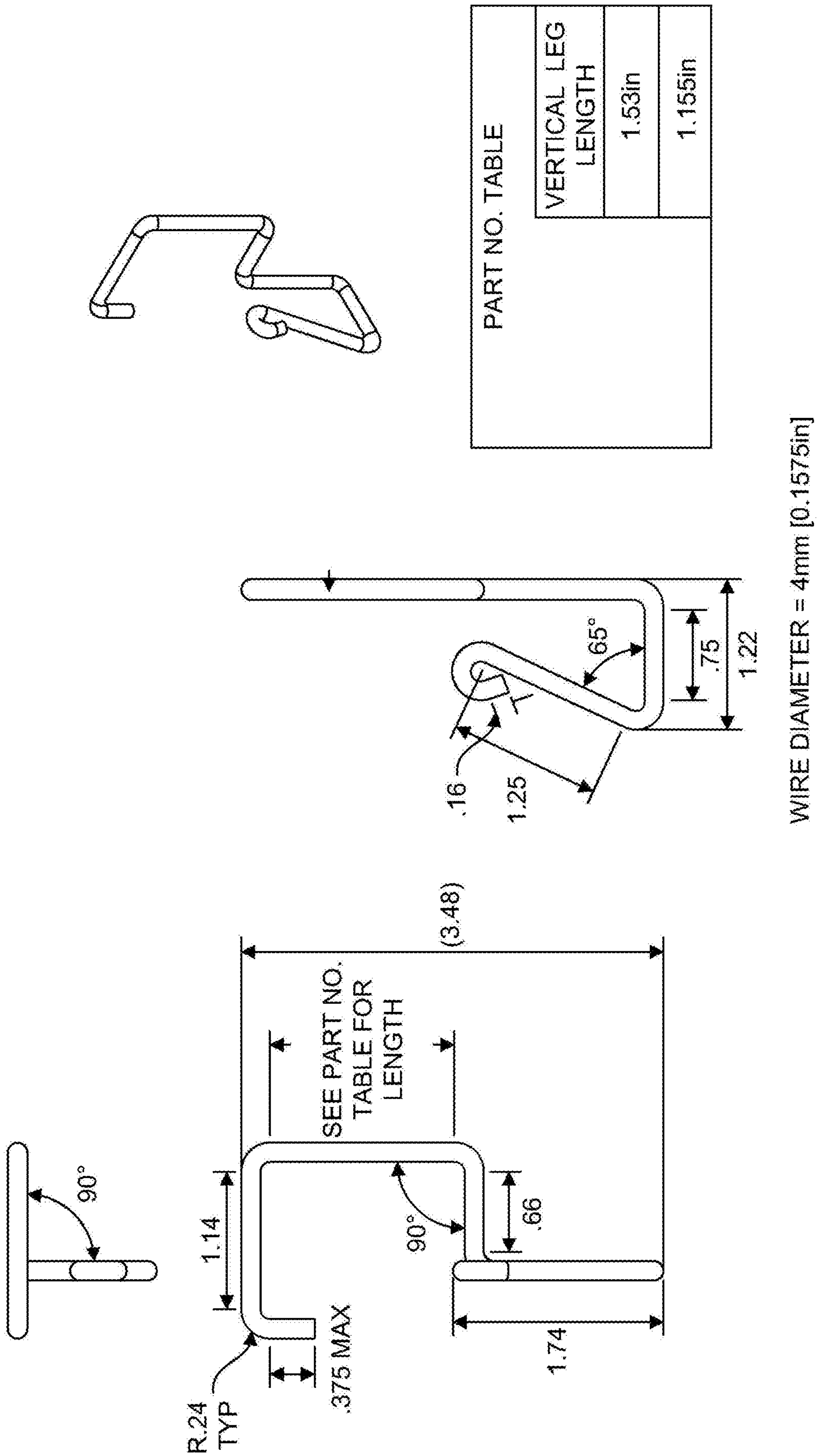
Figure 72:
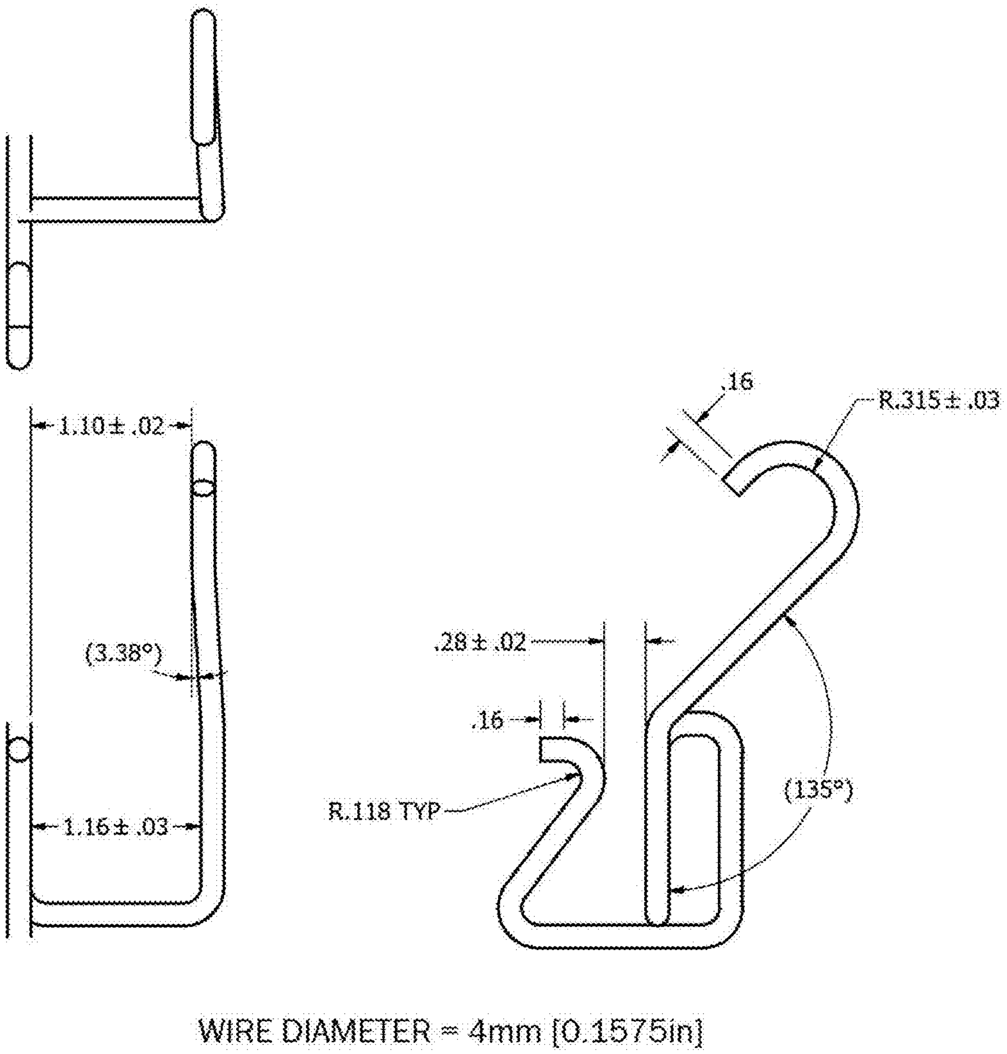
Figure 73:
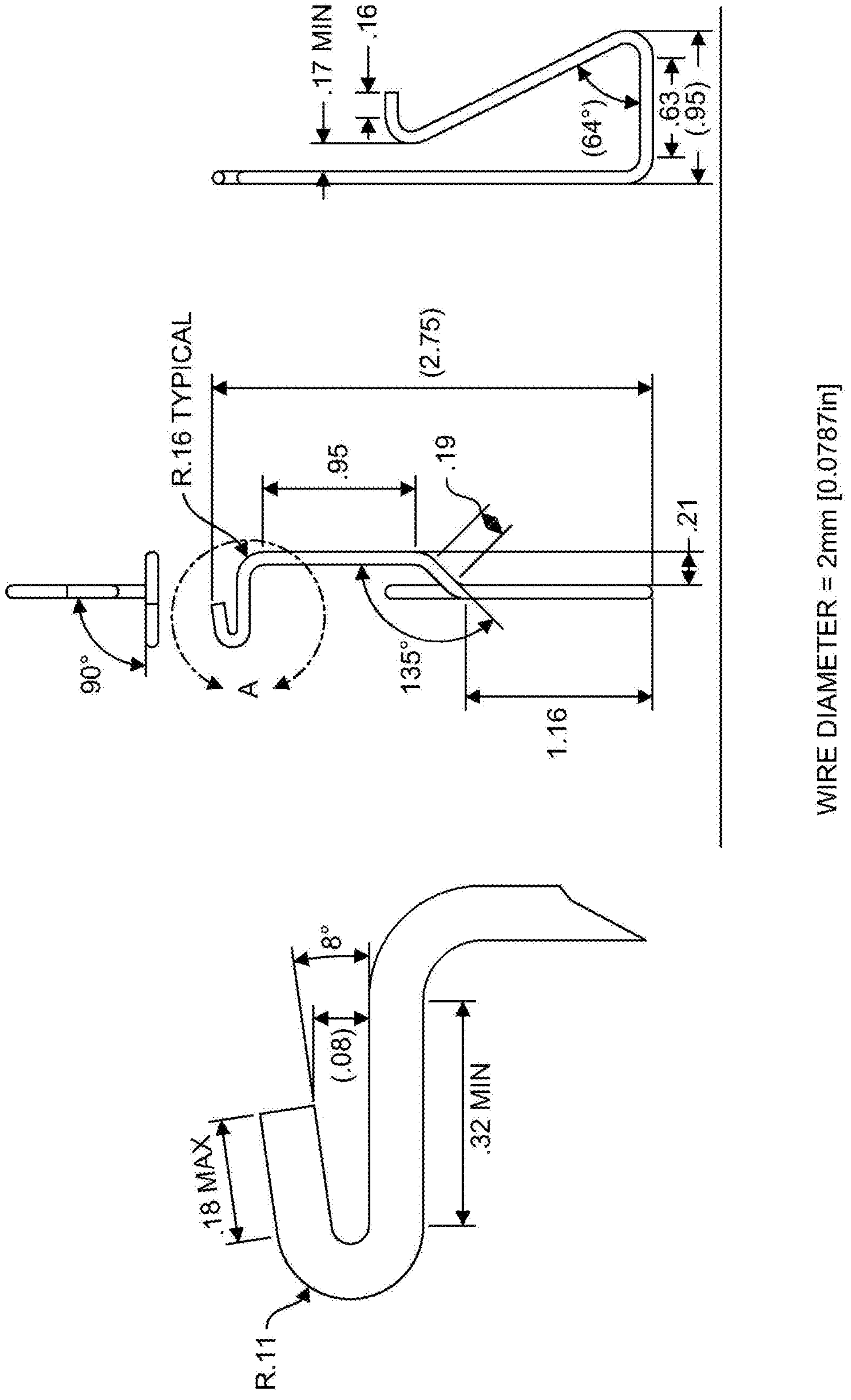
Figure 74:
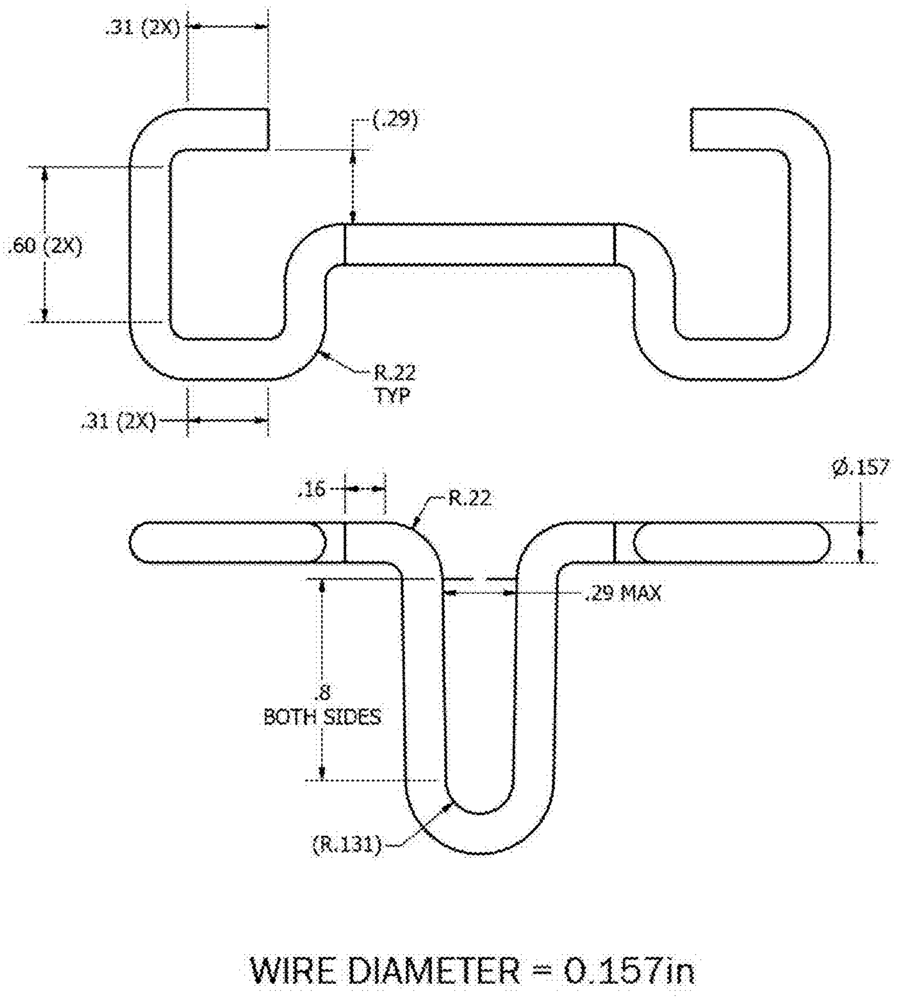
Figure 75:
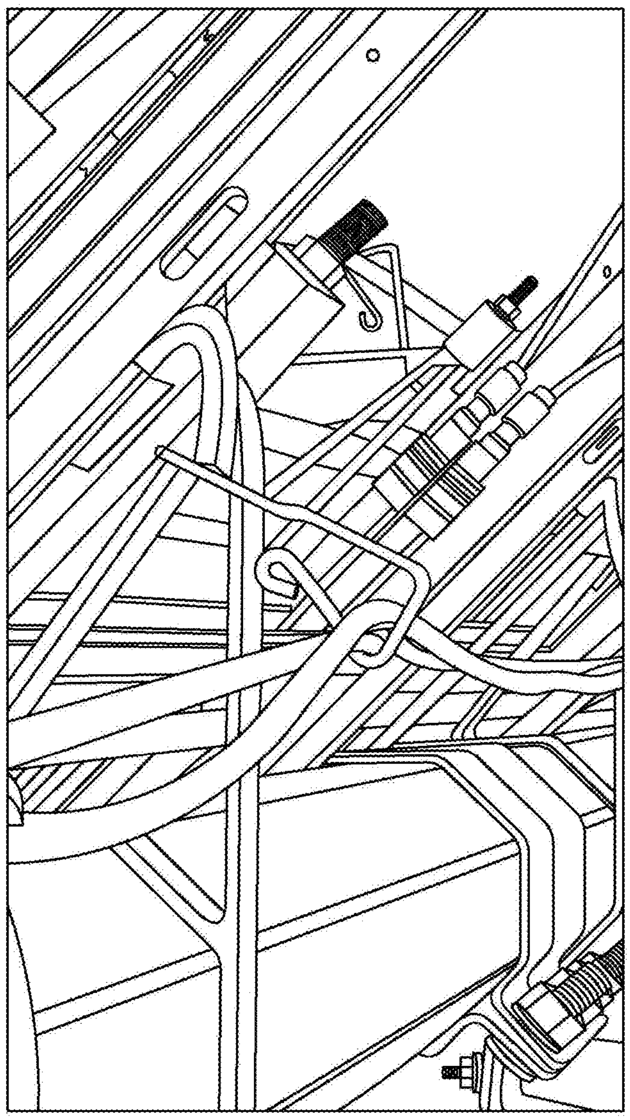
FIG. 75 is a side perspective view of the wire positioning device of FIG. 71 arranged on a support structure and supporting a cable.

FIG. 75 is a side perspective view of the wire positioning device of FIG. 71 arranged on a support structure and supporting a cable.

Figure 40:
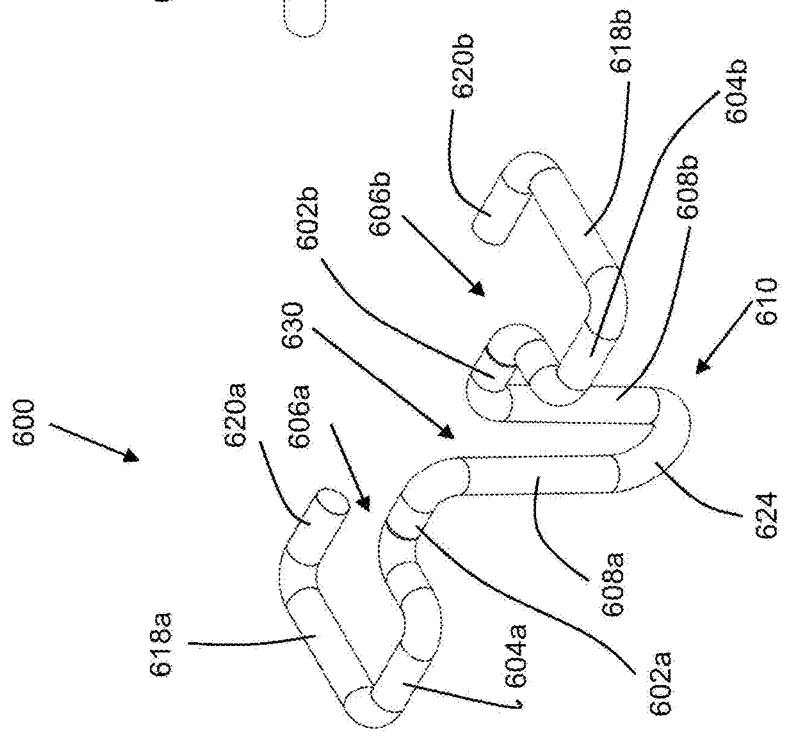
FIG. 40 is a top perspective view of one embodiment of a wire positioning device.
Figure 43:
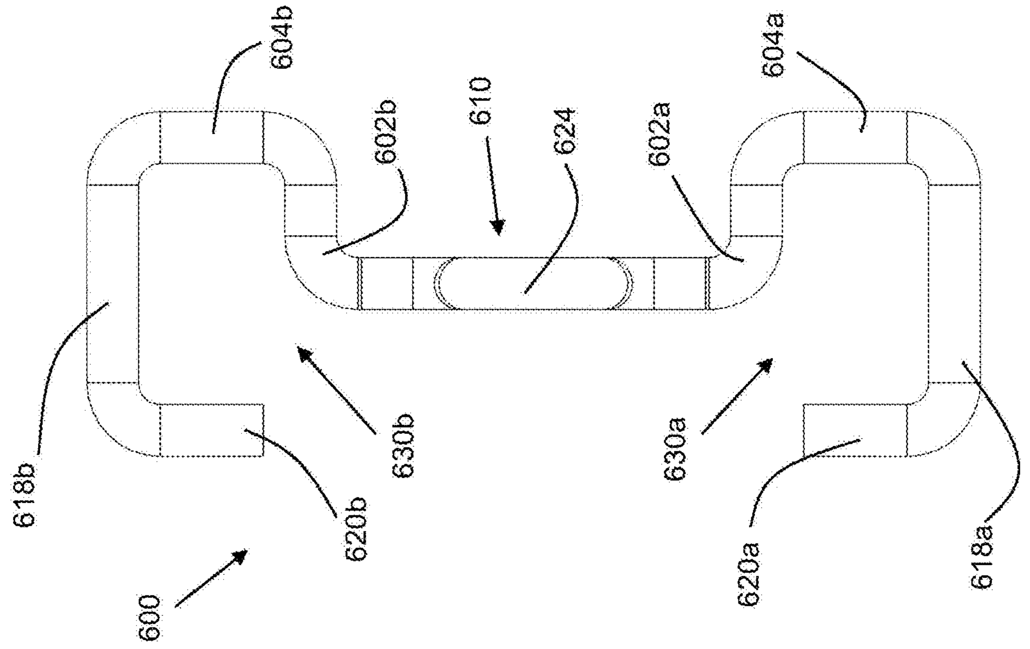
FIG. 43 is a bottom view of the wire positioning device of FIG. 40.
Figure 42:
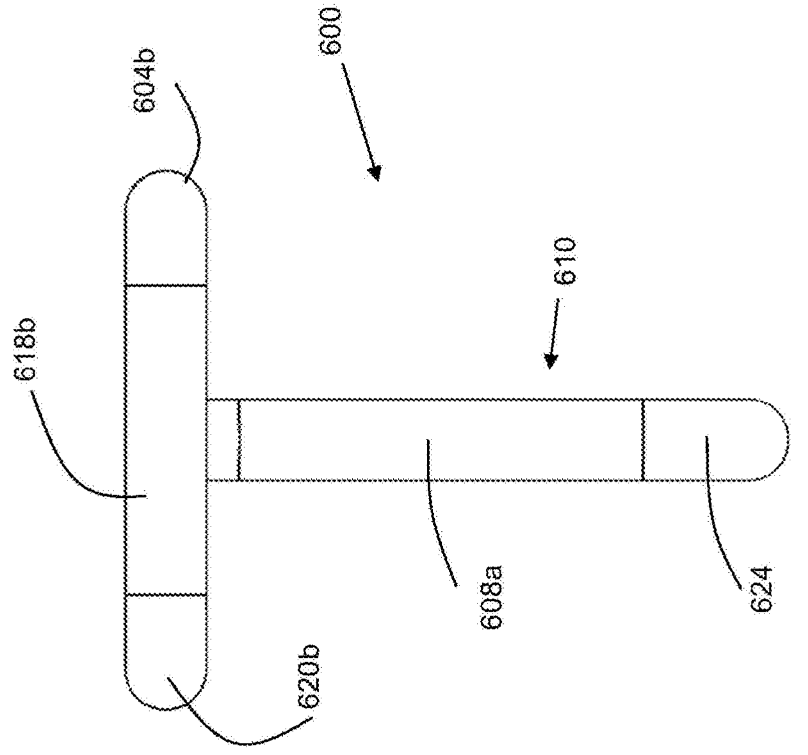
FIG. 42 is a left side view of the wire positioning device of FIG. 40.
Figure 44:
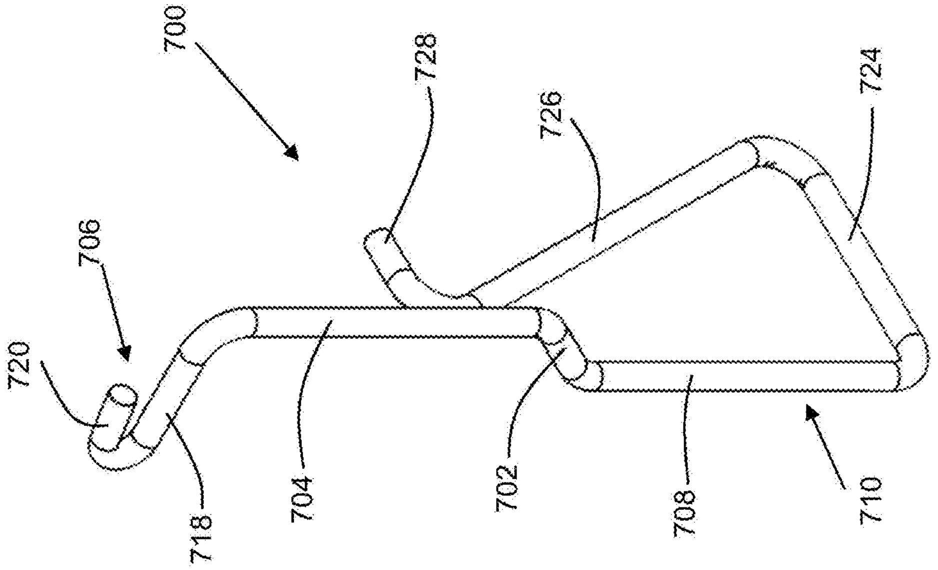
FIG. 44 is a top perspective view of one embodiment of a wire positioning device.
Figure 45:
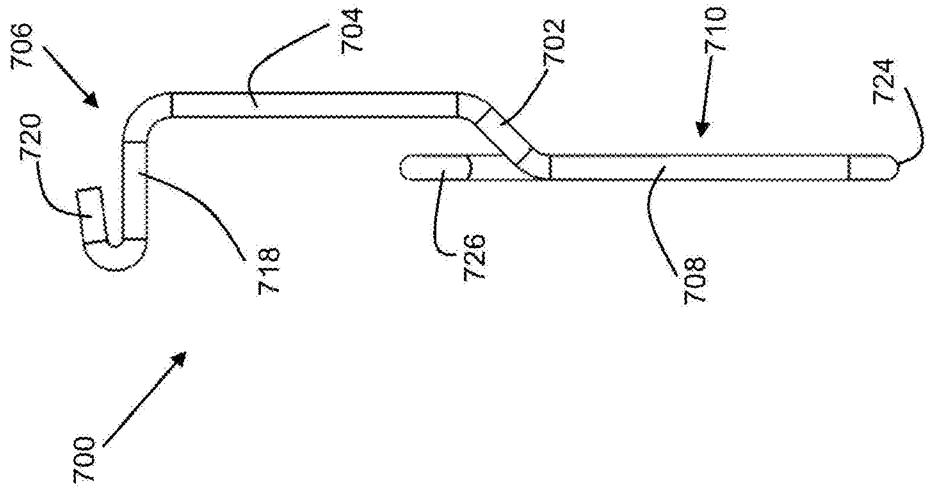
FIG. 45 is a front view of the wire positioning device of FIG. 44.
Figure 47:
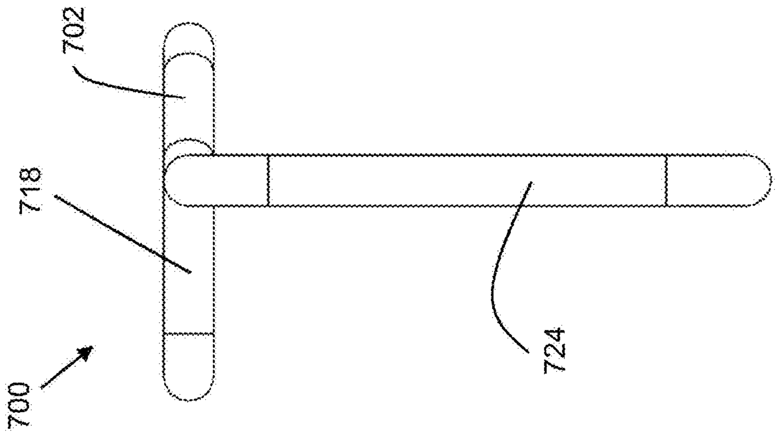
FIG. 47 is a bottom view of the wire positioning device of FIG. 44.
Figure 46:
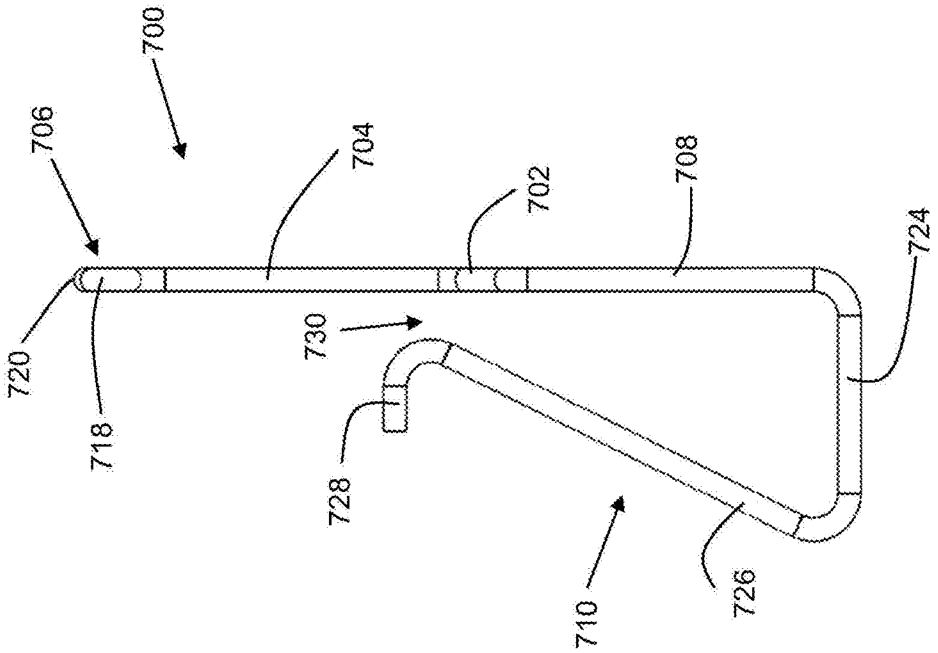
FIG. 46 is a left side view of the wire positioning device of FIG. 44.
Figure 49:
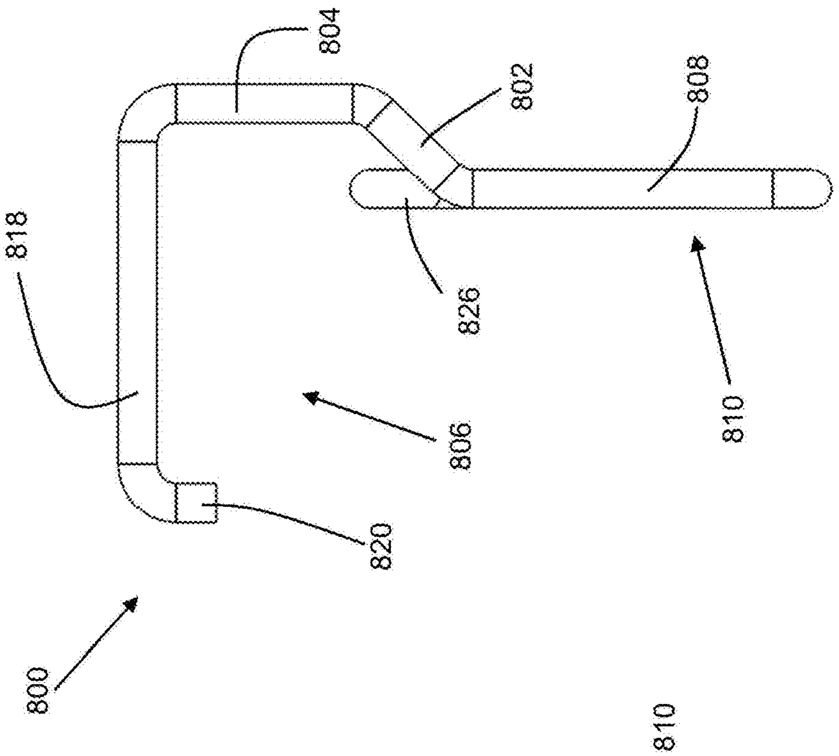
FIG. 49 is a front view of the wire positioning device of FIG. 48.
Figure 48:
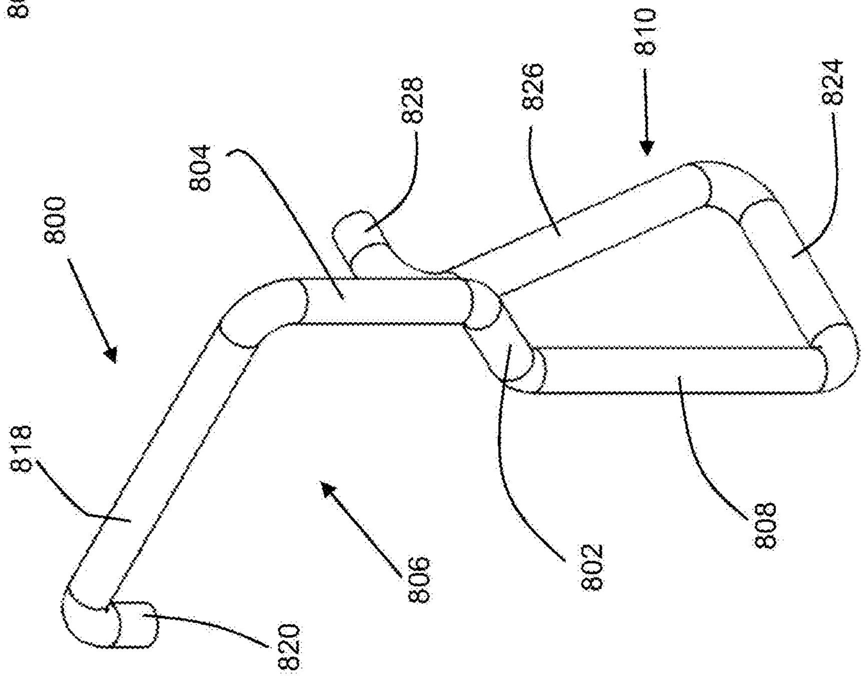
FIG. 48 is a top perspective view of one embodiment of a wire positioning device.
Figure 51:
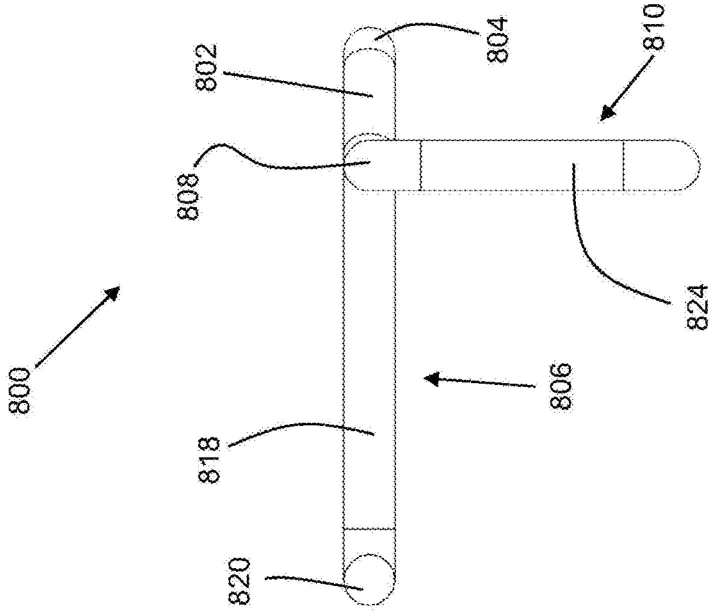
FIG. 51 is a bottom view of the wire positioning device of FIG. 48.
Figure 50:
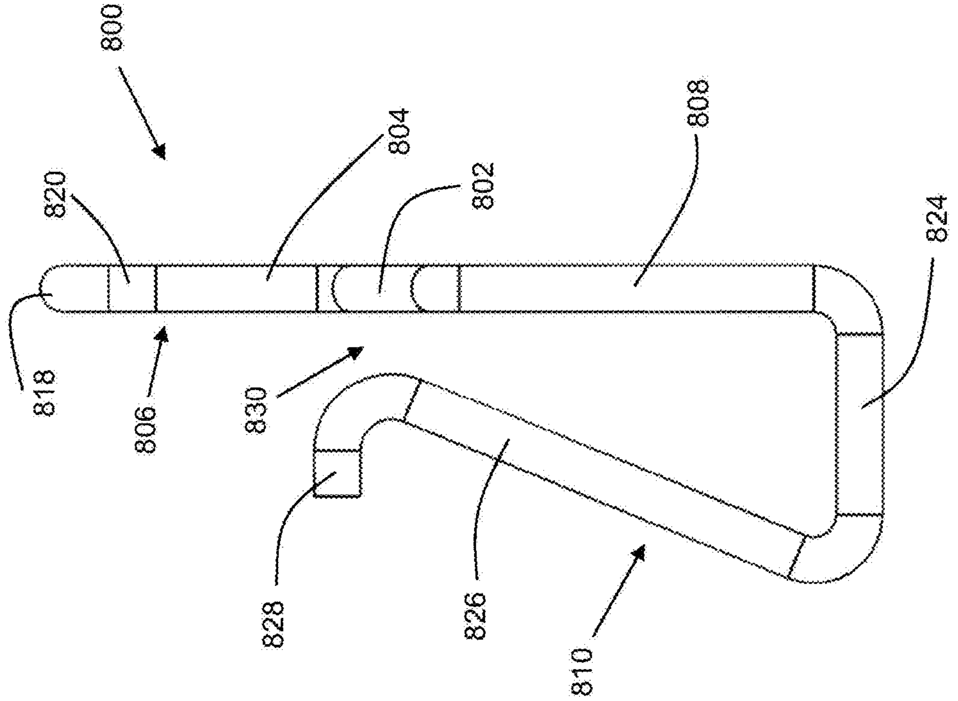
FIG. 50 is a left side view of the wire positioning device of FIG. 48.
Figure 53:
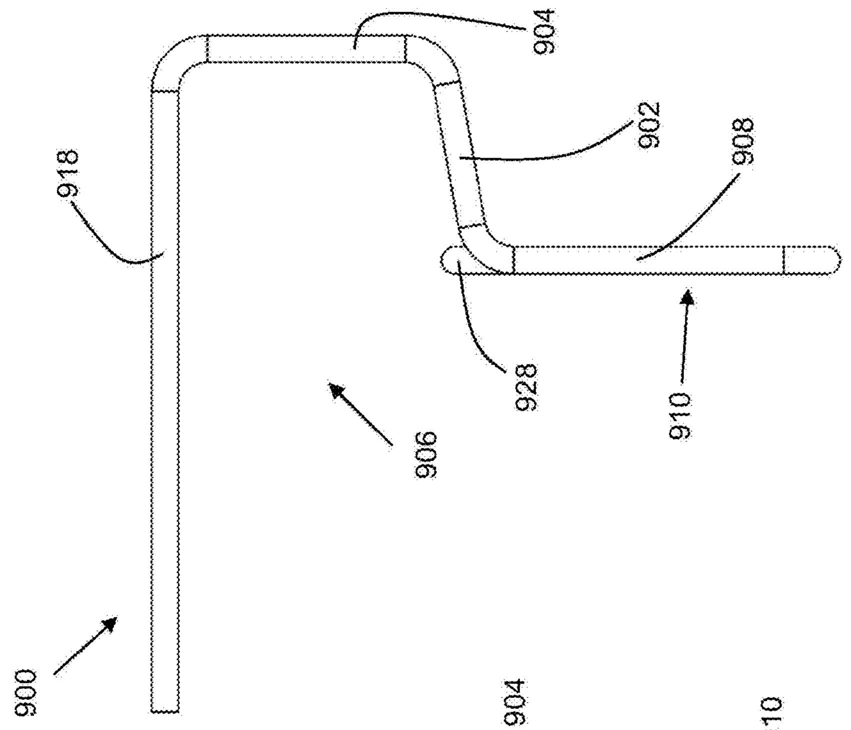
FIG. 53 is a front view of the wire positioning device of FIG. 52.
Figure 52:
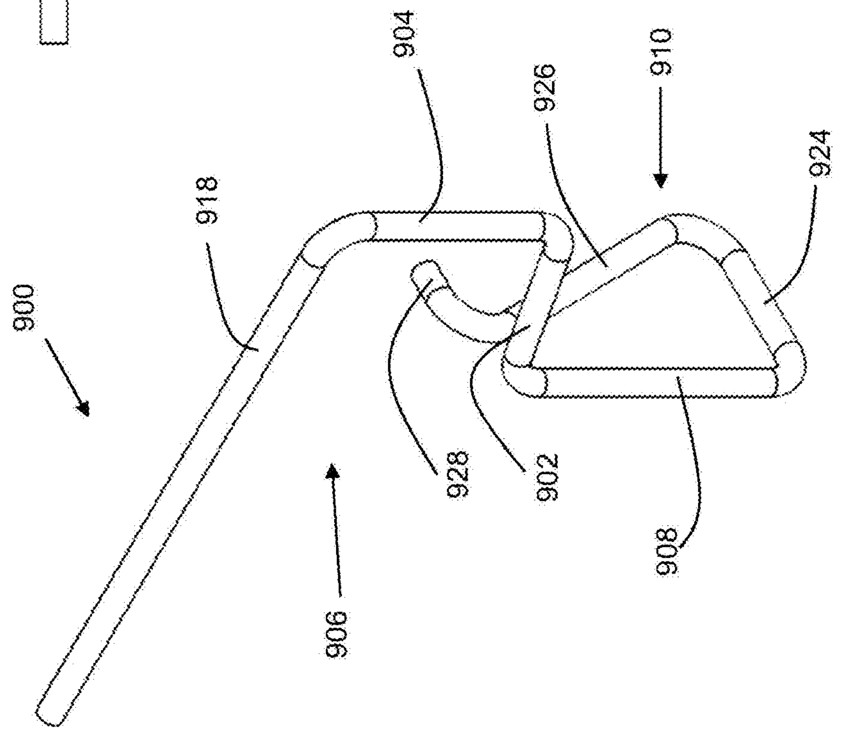
FIG. 52 is a top perspective view of one embodiment of a wire positioning device.
Figure 55:
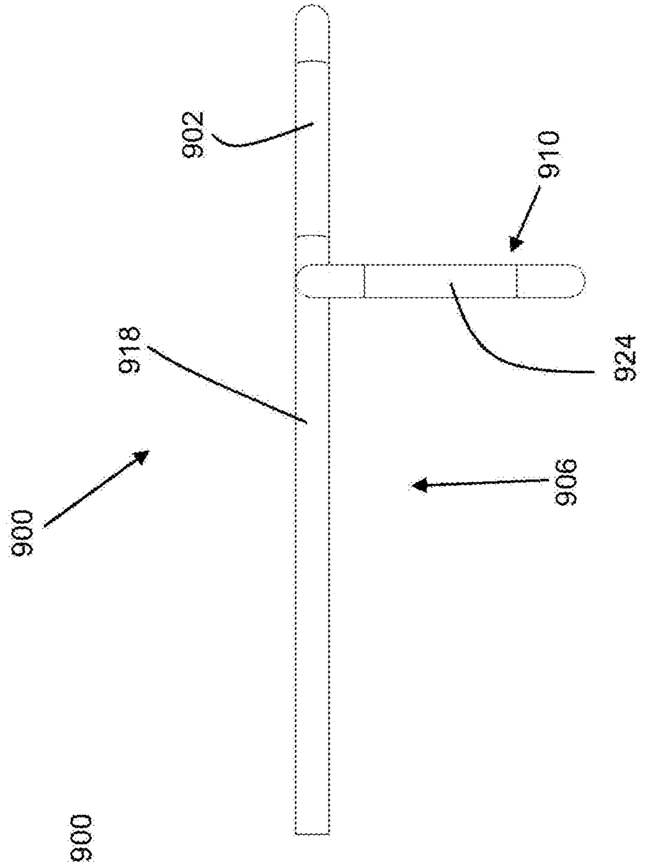
FIG. 55 is a bottom view of the wire positioning device of FIG. 52.
Figure 54:
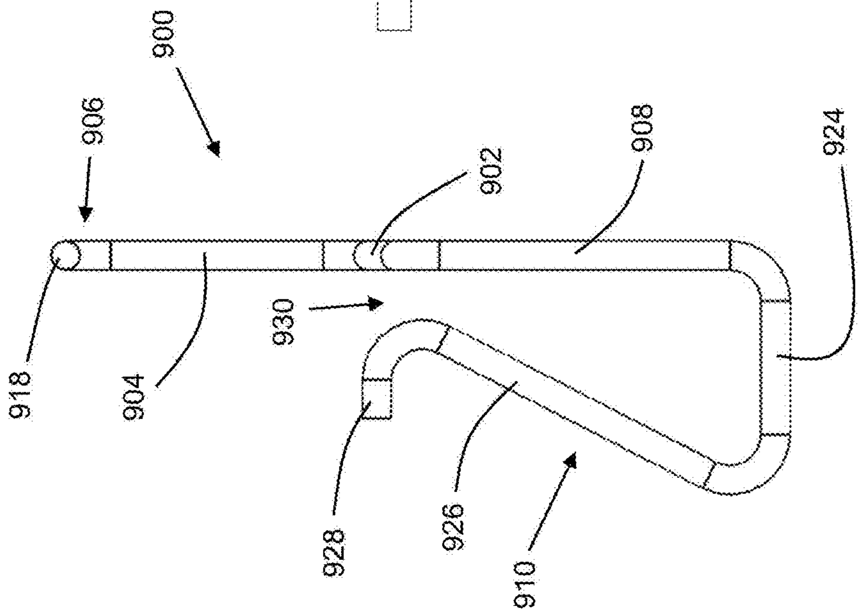
FIG. 54 is a left side view of the wire positioning device of FIG. 52.
Figure 55A:
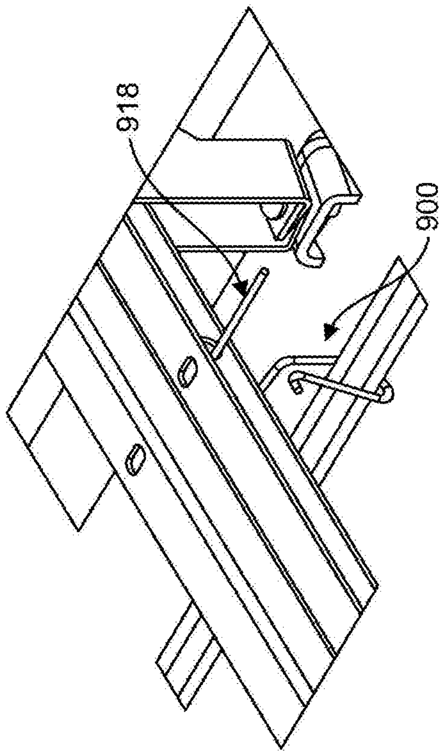
FIG. 55*a* is a top perspective view of the wire positioning device of FIG. 52 during insertion into a support structure.
Figure 55B:
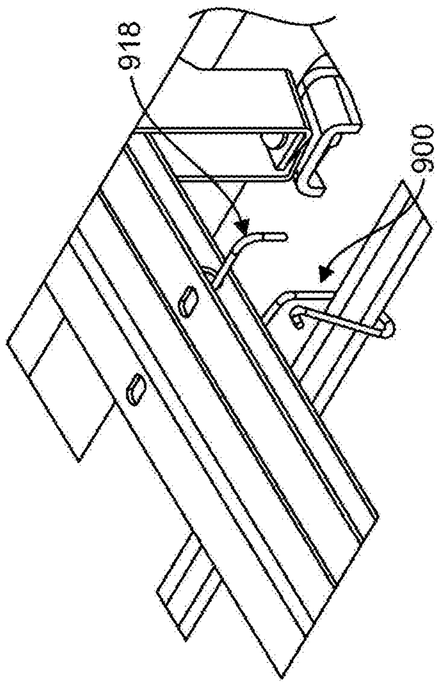
FIG. 55*b* is a top perspective view of the wire positioning device of FIG. 52 during insertion into a support structure.
Figure 57:
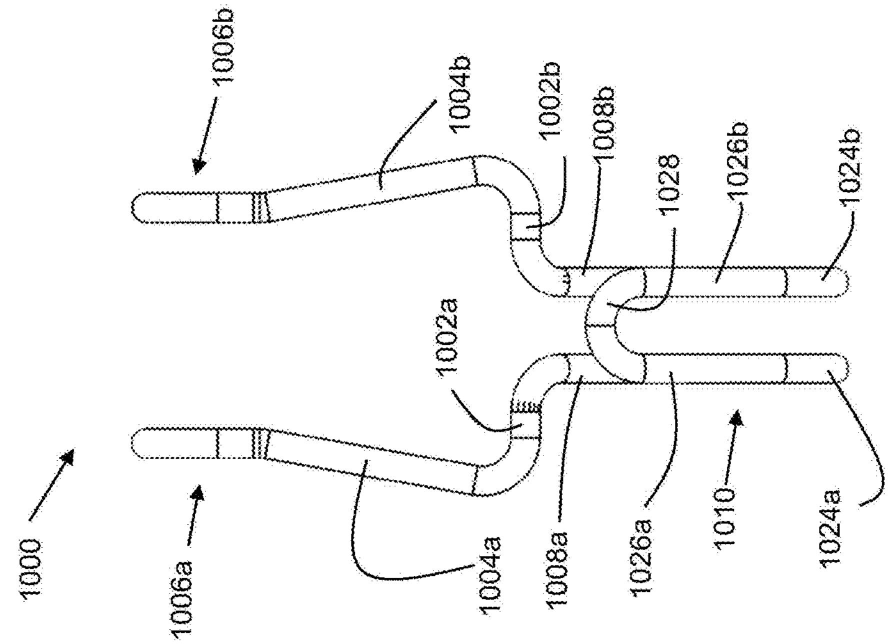
FIG. 57 is a front view of the wire positioning device of FIG. 56.
Figure 56:
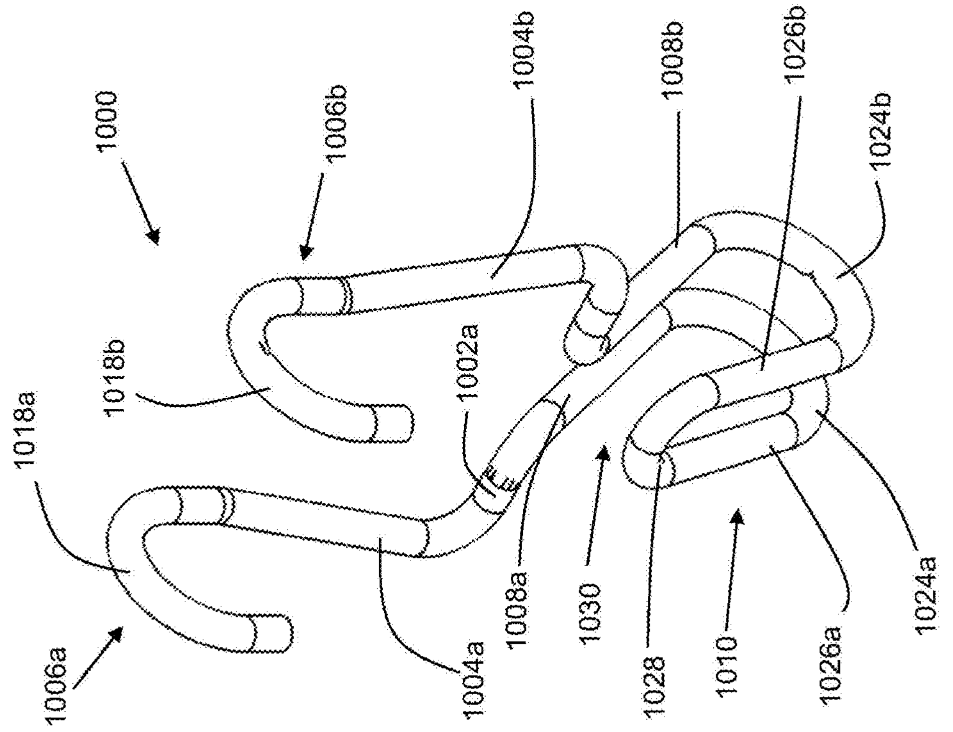
FIG. 56 is a top perspective view of one embodiment of a wire positioning device.
Figure 59:
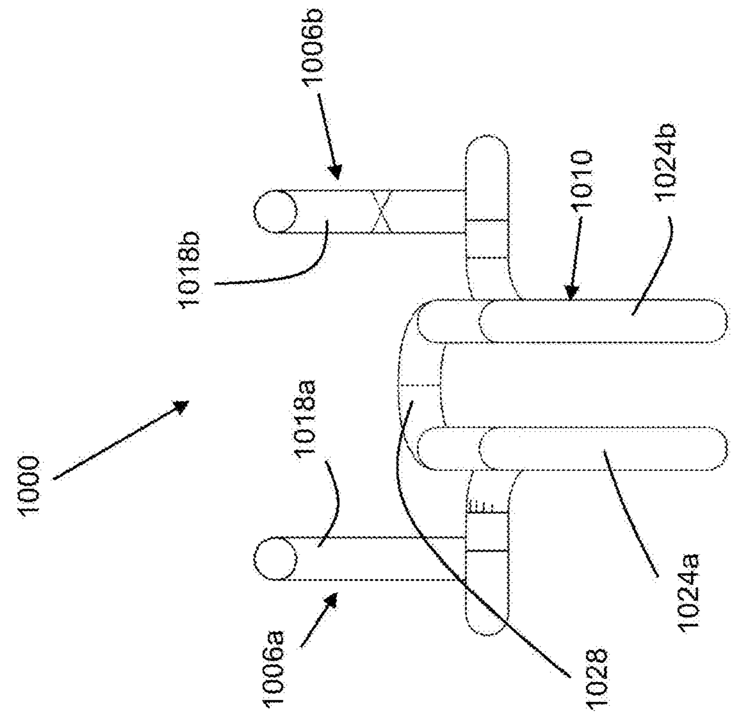
FIG. 59 is a bottom view of the wire positioning device of FIG. 56.
Figure 58:
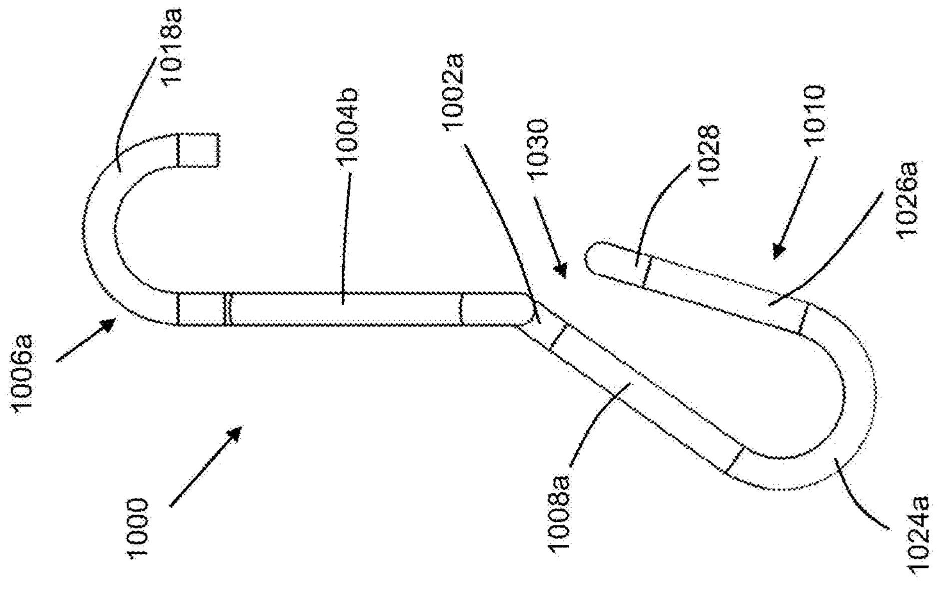
FIG. 58 is a left side view of the wire positioning device of FIG. 56.
Figure 62:
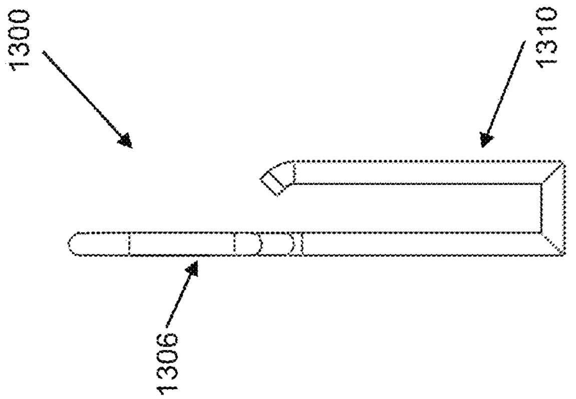
FIG. 62 is a left side view of one embodiment of a wire positioning device.
Figure 61:
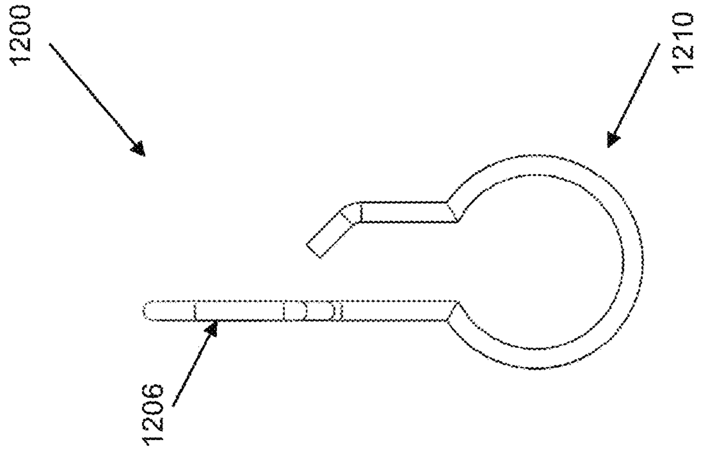
FIG. 61 is a left side view of one embodiment of a wire positioning device.
Figure 60:
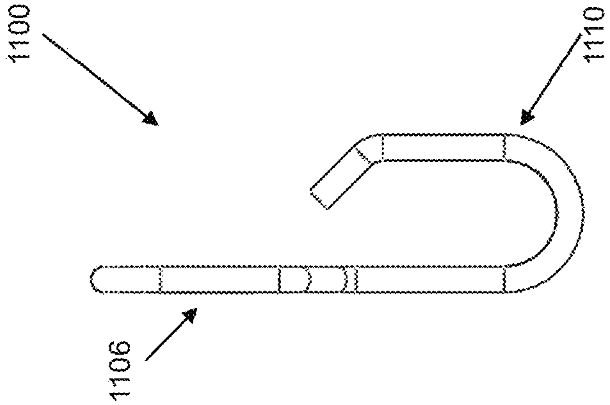
FIG. 60 is a left side view of one embodiment of a wire positioning device.
Figure 64:
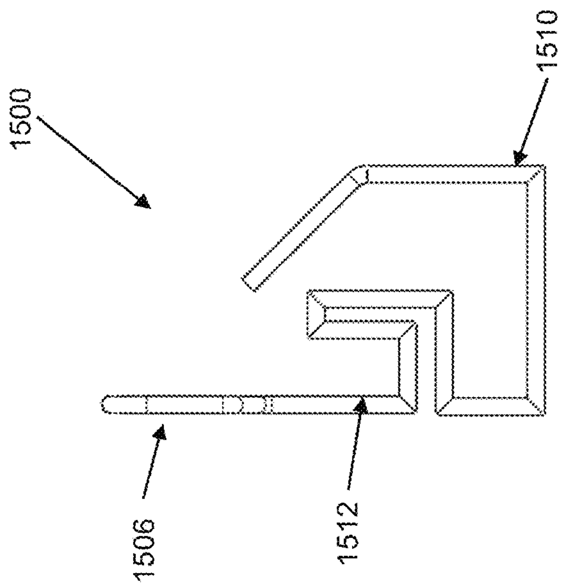
FIG. 64 is a left side view of one embodiment of a wire positioning device.
Figure 63:
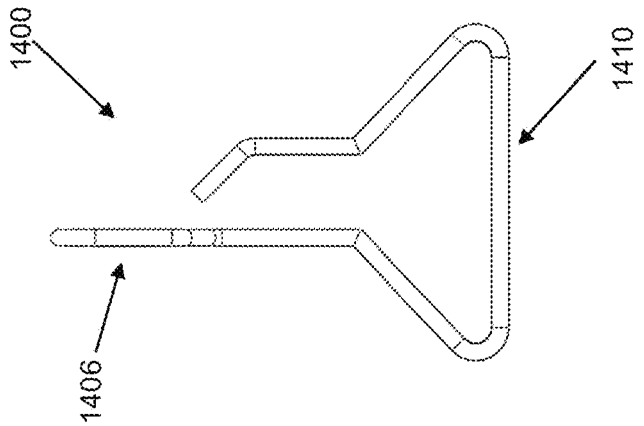
FIG. 63 is a left side view of one embodiment of a wire positioning device.
Figure 76:
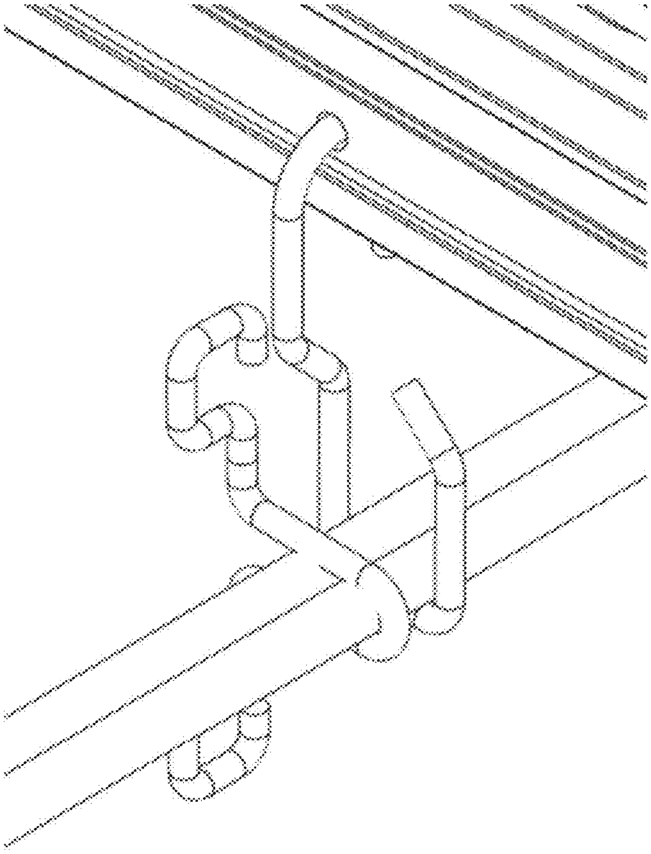
FIG. 76 is a top perspective view of the wire positioning device of FIG. 40 coupled to a solar cabling and configured to act as a stopper to prevent the solar cabling from shifting and moving in a wire positioning device.

FIG. 76 is a top perspective view of the wire positioning device of FIG. 40 coupled to a solar cabling and configured to act as a stopper to prevent the solar cabling from shifting and moving in a wire positioning device.

Figure 77:
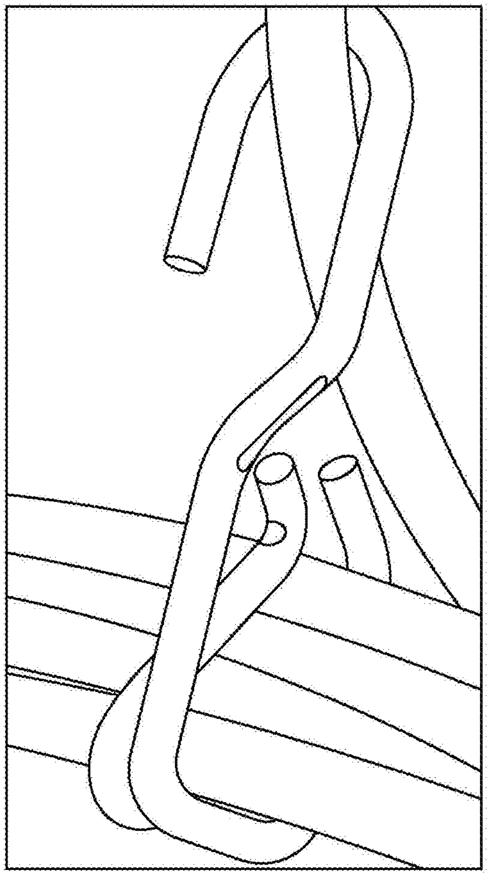
FIG. 77 is a top perspective view of another embodiment of a wire positioning device coupled to a solar cabling and configured to act as a stopper to prevent solar cabling from shifting and moving in a wire positioning device.

FIG. 77 is a top perspective view of another embodiment of a wire positioning device coupled to a solar cabling and configured to act as a stopper to prevent solar cabling from shifting and moving in a wire positioning device.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A wire positioning device system, comprising:

a support structure;

at least one cable; and a wire positioning device, comprising:

a center leg having a distal end and a proximal end;

an attachment support leg arranged on the proximal end of the center leg;

an extension portion arranged on the attachment support leg opposite the center leg, and configured to couple the wire positioning device to the support structure, wherein the extension portion includes a straight portion and an end portion, wherein the end portion is positioned at an angle relative to the straight portion;

a saddle support leg positioned on the distal end of the center leg;

a retention leg positioned on a distal end of the saddle support leg; and a cable support saddle formed from the saddle support leg and the retention leg; and configured to support the at least one cable, wherein the extension portion is positioned perpendicular to the cable support saddle about the center leg.

2. The cable hanger of claim 1, wherein the extension portion is positioned at an angle relative to the cable support saddle about the center leg.

3. The cable hanger of claim 1, wherein the retention leg includes a curved end.

4. The cable hanger of claim 3, wherein the curved end extends away from the center leg.

5. The cable hanger of claim 1, wherein the center leg includes an offset to arrange the attachment support leg and the saddle support leg parallel to one another.

6. The cable hanger of claim 1, wherein a plurality of cables are configured to be arranged within the cable support saddle.

7. The cable hanger of claim 1, wherein the extension portion is configured to partially enclose a portion of the support structure.

8. The cable hanger of claim 1, wherein the extension portion is coupled to the support structure and the at least one cable is positioned within the cable support saddle.

9. The cable hanger of claim 1, wherein the retention leg extends upwards such that a portion of the retention leg is positioned above the extension portion.

10. A wire positioning device, comprising:

a center leg having a distal end and a proximal end;

an attachment support leg arranged on the proximal end of the center leg;

an extension portion arranged on the attachment support leg opposite the center leg, and configured to couple the wire positioning device to a support structure, wherein the extension portion includes a straight portion and an end portion, wherein the end portion is positioned at an angle relative to the straight portion;

a saddle support leg positioned on the distal end of the center leg;

a retention leg positioned on a distal end of the saddle support leg; and a cable support saddle formed from the saddle support leg and the retention leg; and configured to support the at least one cable, wherein the extension portion is positioned perpendicular to the cable support saddle about the center leg.

11. The cable hanger of claim 10, wherein the extension portion is positioned at an angle relative to the cable support saddle about the center leg.

12. The cable hanger of claim 10, wherein the retention leg includes a curved end.

13. The cable hanger of claim 12, wherein the curved end extends away from the center leg.

14. The cable hanger of claim 10, wherein the center leg includes an offset to arrange the attachment support leg and the saddle support leg parallel to one another.

15. The cable hanger of claim 10, wherein a plurality of cables are configured to be arranged within the cable support saddle.

16. The cable hanger of claim 10, wherein the extension portion is configured to partially enclose a portion of the support structure.

17. The cable hanger of claim 10, wherein the extension portion is coupled to the support structure and the at least one cable is positioned within the cable support saddle.

18. The cable hanger of claim 10, wherein the retention leg extends upwards such that a portion of the retention leg is positioned above the extension portion.

* * * * *